United States Patent
Thorson et al.

(10) Patent No.: US 8,266,991 B2
(45) Date of Patent: Sep. 18, 2012

(54) PIPE CUTTER

(75) Inventors: Troy C. Thorson, Waukesha, WI (US);
Daniel J. Alberti, Brookfield, WI (US);
Thomas R. Bednar, Pewaukee, WI (US); John S. Scott, Brookfield, WI (US); Scott Anderson, Racine, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 399 days.

(21) Appl. No.: 12/530,690

(22) PCT Filed: Mar. 14, 2008

(86) PCT No.: PCT/US2008/057147
§ 371 (c)(1),
(2), (4) Date: Nov. 24, 2009

(87) PCT Pub. No.: WO2008/113050
PCT Pub. Date: Sep. 18, 2008

(65) Prior Publication Data
US 2010/0088898 A1    Apr. 15, 2010

Related U.S. Application Data

(60) Provisional application No. 60/990,862, filed on Nov. 28, 2007, provisional application No. 60/895,062, filed on Mar. 15, 2007.

(51) Int. Cl.
*B23D 21/08* (2006.01)
(52) U.S. Cl. .................................. 82/76; 82/99.1; 30/101
(58) Field of Classification Search ................ 30/95–99, 30/101; 82/59, 62, 64, 76, 77, 100, 99.1, 82/99.2
See application file for complete search history.

(56) References Cited

U.S. PATENT DOCUMENTS

| 195,307 A | 9/1877 | Post |
| 882,432 A | 3/1908 | Thomas |
| 1,242,931 A | 10/1917 | Foringer |
| 1,797,076 A | 3/1931 | Davies |
| 2,195,568 A | 4/1940 | Hexdall |

(Continued)

FOREIGN PATENT DOCUMENTS

CA    987485    4/1976

(Continued)

OTHER PUBLICATIONS

PCT/US2008/057147 International Search Report.

*Primary Examiner* — Kenneth E. Peterson
(74) *Attorney, Agent, or Firm* — Michael Best & Friedrich LLP

(57) ABSTRACT

A pipe cutter for cutting a pipe includes a cutting head assembly having a first carriage and a second carriage spaced apart to define a cutting area. The first carriage supports a cutting mechanism, and the second carriage is configured to support a pipe within the cutting area. The carriages have a locked state and an unlocked state such that when the carriages are in the unlocked state, the carriages are movable relative to each other and biased into the cutting area. The pipe cutter also includes a drive assembly configured to rotate the cutting head assembly and a locking mechanism configured for changing the carriages from the unlocked state to the locked state and for holding the carriages in the locked state. The locking mechanism includes an actuation member rotatably coupled to the first carriage.

36 Claims, 23 Drawing Sheets

U.S. PATENT DOCUMENTS

| | | |
|---|---|---|
| 2,379,177 A | 6/1945 | Pavey |
| 2,447,371 A | 8/1948 | Sipsma et al. |
| 2,696,065 A | 12/1954 | Harmes |
| 2,699,604 A | 1/1955 | Ingwer et al. |
| 2,747,274 A | 5/1956 | Willard et al. |
| 2,769,235 A | 11/1956 | Martois |
| 2,973,576 A | 3/1961 | Hentke |
| 3,088,352 A | 5/1963 | Tanner |
| 3,370,352 A | 2/1968 | Steely |
| 3,449,992 A | 6/1969 | Hanaway |
| 3,456,856 A | 7/1969 | Berberian et al. |
| 3,651,569 A | 3/1972 | Arnot |
| 3,715,804 A | 2/1973 | Kelley |
| 3,807,047 A | 4/1974 | Sherer et al. |
| 3,834,019 A | 9/1974 | Smeltzer et al. |
| 3,839,791 A | 10/1974 | Feamster, III |
| 3,858,317 A | 1/1975 | Ford et al. |
| 3,942,248 A | 3/1976 | Sherer |
| 3,957,146 A | 5/1976 | LeBlanc |
| 3,974,562 A | 8/1976 | Wuchner |
| 3,988,827 A | 11/1976 | Sakamoto et al. |
| 4,108,034 A | 8/1978 | Thomas |
| 4,149,312 A | 4/1979 | Arnot |
| 4,271,591 A | 6/1981 | Aubriot |
| 4,305,205 A | 12/1981 | Girala |
| 4,369,573 A | 1/1983 | Vitale |
| 4,397,202 A | 8/1983 | Mayfield et al. |
| 4,416,062 A | 11/1983 | Cummings |
| 4,438,562 A | 3/1984 | Courty |
| 4,443,943 A | 4/1984 | Maruyama |
| 4,493,150 A | 1/1985 | Garcia et al. |
| 4,542,568 A | 9/1985 | Venables, III et al. |
| 4,624,052 A | 11/1986 | Garcia et al. |
| 4,667,936 A | 5/1987 | Hale, Jr. |
| 4,734,982 A | 4/1988 | Khoja |
| 4,739,554 A | 4/1988 | Hytonen |
| 4,747,212 A | 5/1988 | Cavdek |
| 4,762,038 A | 8/1988 | Olson |
| 4,763,413 A | 8/1988 | Rothenberger |
| 4,769,911 A | 9/1988 | Araki |
| 4,770,074 A | 9/1988 | Kwech |
| 4,800,336 A | 1/1989 | Mikami et al. |
| 4,802,278 A | 2/1989 | Vanderpol et al. |
| 4,813,314 A | 3/1989 | Kwech |
| 4,825,543 A | 5/1989 | Thalmann et al. |
| 4,831,732 A | 5/1989 | Garton |
| 4,837,931 A | 6/1989 | Beermann |
| 4,845,849 A | 7/1989 | Aubriot |
| 4,845,850 A | 7/1989 | Rothenberger |
| 4,847,997 A | 7/1989 | Petty |
| 4,848,846 A | 7/1989 | Yamada et al. |
| 4,858,316 A | 8/1989 | Dubey |
| 4,890,385 A | 1/1990 | VanderPol et al. |
| 4,934,225 A | 6/1990 | Languillat |
| 4,939,964 A | 7/1990 | Ricci |
| 4,953,292 A | 9/1990 | Tobey |
| 5,012,579 A | 5/1991 | Matsumoto |
| 5,018,275 A | 5/1991 | Huang |
| 5,033,153 A | 7/1991 | Post |
| 5,046,250 A | 9/1991 | Huang |
| 5,070,616 A | 12/1991 | Chen |
| 5,084,970 A | 2/1992 | Garanhel |
| 5,088,196 A | 2/1992 | Fukuda |
| 5,099,577 A | 3/1992 | Hutt |
| 5,103,699 A | 4/1992 | Brown |
| 5,129,158 A | 7/1992 | Campagna |
| 5,189,933 A | 3/1993 | Ricci |
| 5,206,996 A | 5/1993 | McDaniel |
| 5,214,988 A | 6/1993 | Quigley |
| 5,218,765 A | 6/1993 | Huang |
| 5,230,150 A | 7/1993 | Sperti |
| 5,243,760 A | 9/1993 | May, Jr. |
| 5,285,576 A | 2/1994 | Taylor |
| 5,293,156 A | 3/1994 | Shoji et al. |
| 5,301,427 A | 4/1994 | Swatek |
| 5,315,759 A | 5/1994 | Mashata |
| 5,335,570 A | 8/1994 | Ro |
| 5,345,682 A | 9/1994 | Dubinsky et al. |
| 5,373,639 A | 12/1994 | Huang |
| 5,414,932 A | 5/1995 | Azkona |
| 5,461,955 A | 10/1995 | Weisshaar |
| 5,475,924 A | 12/1995 | McDaniel |
| 5,495,672 A | 3/1996 | Kritchever et al. |
| 5,515,609 A | 5/1996 | Sperti |
| 5,528,830 A | 6/1996 | Hansen |
| 5,592,741 A | 1/1997 | Vassar |
| 5,605,084 A | 2/1997 | Pierce |
| 5,642,566 A | 7/1997 | Hirabayashi |
| 5,657,417 A | 8/1997 | Di Troia |
| 5,671,646 A | 9/1997 | Sandford |
| 5,718,051 A | 2/1998 | Huang |
| 5,752,420 A | 5/1998 | Connors |
| 5,813,299 A | 9/1998 | Soucy |
| 5,829,142 A | 11/1998 | Rieser |
| 5,836,079 A | 11/1998 | Cronin et al. |
| 5,862,593 A | 1/1999 | Huang |
| 5,894,772 A | 4/1999 | Nodar |
| 5,903,980 A | 5/1999 | Collier et al. |
| 5,907,906 A | 6/1999 | Sweeney |
| 5,924,201 A | 7/1999 | Wang |
| 5,933,963 A | 8/1999 | Pierce |
| 5,943,778 A | 8/1999 | Alana |
| 5,956,853 A | 9/1999 | Watamura |
| 5,987,750 A | 11/1999 | Tally |
| 6,014,810 A | 1/2000 | Earle et al. |
| 6,032,367 A | 3/2000 | Bonnette |
| 6,055,732 A | 5/2000 | Hu |
| 6,065,212 A | 5/2000 | Lazarevic |
| 6,067,716 A | 5/2000 | Carter |
| 6,095,021 A | 8/2000 | Epperson |
| 6,098,291 A | 8/2000 | Wang |
| 6,154,964 A | 12/2000 | Tally |
| 6,178,643 B1 | 1/2001 | Erbrick et al. |
| 6,202,307 B1 | 3/2001 | Wrate |
| 6,226,823 B1 | 5/2001 | Ma Gee |
| 6,237,449 B1 | 5/2001 | Orlosky |
| 6,336,270 B1 | 1/2002 | Dureiko |
| 6,345,444 B1 | 2/2002 | Gillet et al. |
| 6,357,119 B1 | 3/2002 | Acerra |
| 6,370,780 B1 | 4/2002 | Robertson et al. |
| 6,393,700 B1 | 5/2002 | Babb |
| 6,401,340 B1 | 6/2002 | King |
| 6,430,815 B1 | 8/2002 | Wickline |
| 6,460,438 B2 | 10/2002 | Richards |
| 6,467,172 B1 | 10/2002 | Jenq |
| 6,481,105 B1 | 11/2002 | Haung |
| 6,487,776 B2 | 12/2002 | Chang |
| 6,513,245 B1 | 2/2003 | Aubriot |
| 6,553,669 B2 | 4/2003 | Carter |
| 6,553,670 B2 | 4/2003 | Chang |
| 6,568,086 B2 | 5/2003 | Kramer |
| 6,578,267 B2 | 6/2003 | Seyfer |
| 6,581,499 B2 | 6/2003 | Myers |
| 6,609,447 B2 | 8/2003 | Richards |
| 6,637,115 B2 | 10/2003 | Walsh et al. |
| 6,658,738 B1 | 12/2003 | King |
| 6,658,739 B1 | 12/2003 | Huang |
| 6,666,062 B2 | 12/2003 | Dole et al. |
| 6,671,962 B2 | 1/2004 | Watamura |
| 6,698,048 B1 | 3/2004 | Greene |
| 6,698,321 B2 | 3/2004 | Oswald |
| 6,739,055 B2 | 5/2004 | Lee |
| 6,751,867 B1 | 6/2004 | Whyte |
| 6,753,625 B2 | 6/2004 | Kelsey |
| 6,810,587 B1 | 11/2004 | Robertson |
| 6,938,313 B2 | 9/2005 | Viola et al. |
| 6,941,660 B1 | 9/2005 | Varos |
| 6,968,761 B2 | 11/2005 | Frank |
| 6,973,727 B2 | 12/2005 | Yao |
| 6,994,009 B2 | 2/2006 | Carter |
| 7,007,391 B2 | 3/2006 | Stoick et al. |
| 7,013,567 B2 | 3/2006 | Myers |
| 7,020,967 B2 | 4/2006 | Kimura |
| 7,036,605 B2 | 5/2006 | Suzuki et al. |
| 7,089,668 B1 | 8/2006 | Whitehead |
| 7,127,819 B1 | 10/2006 | Huang |
| 7,137,762 B2 | 11/2006 | Severa et al. |

| | | |
|---|---|---|
| 7,152,325 B2 | 12/2006 | Green et al. |
| 7,159,319 B2 | 1/2007 | Huang |
| 7,174,638 B2 | 2/2007 | Singer |
| 7,185,409 B1 | 3/2007 | Myers |
| 7,204,021 B2 | 4/2007 | Houseman et al. |
| 7,257,895 B2 | 8/2007 | Makkonen et al. |
| 7,275,320 B2 | 10/2007 | Lee |
| 7,293,362 B2 | 11/2007 | Konen |
| 7,316,069 B2 | 1/2008 | Graybeal |
| 7,346,986 B2 | 3/2008 | Feith |
| 7,406,769 B1 | 8/2008 | Toussaint |
| 7,649,337 B2 | 1/2010 | Uehlein-Proctor et al. |
| 2002/0121173 A1 | 9/2002 | Filipo |
| 2003/0121155 A1 | 7/2003 | Walsh et al. |
| 2004/0093736 A1 | 5/2004 | Kuo |
| 2004/0107806 A1 | 6/2004 | Gruber |
| 2005/0007068 A1 | 1/2005 | Johnson et al. |
| 2005/0115081 A1 | 6/2005 | Tu |
| 2005/0150113 A1 | 7/2005 | Shultis |
| 2005/0198833 A1 | 9/2005 | Lin |
| 2005/0262697 A1 | 12/2005 | Stein |
| 2006/0032351 A1 | 2/2006 | Scinta et al. |
| 2006/0037198 A1 | 2/2006 | Sullivan |
| 2006/0085987 A1 | 4/2006 | Gordon |
| 2006/0092674 A1 | 5/2006 | Belton et al. |
| 2006/0260133 A1 | 11/2006 | Goop |
| 2007/0022610 A1 | 2/2007 | Huang |
| 2007/0050984 A1 | 3/2007 | Bartoluzzi |
| 2007/0137455 A1 | 6/2007 | Watkins |
| 2007/0180701 A1 | 8/2007 | Hutt |
| 2007/0214648 A1 | 9/2007 | Lazarevic |
| 2008/0122404 A1 | 5/2008 | Brotto |
| 2009/0045779 A1 | 2/2009 | Sherman et al. |
| 2009/0165306 A1 | 7/2009 | Nasiell |
| 2009/0199407 A1 | 8/2009 | Lazarevic |
| 2009/0223071 A1 | 9/2009 | Alberti et al. |
| 2009/0307910 A1 | 12/2009 | Schlosser |
| 2010/0018059 A1 | 1/2010 | Huang |

FOREIGN PATENT DOCUMENTS

| | | |
|---|---|---|
| CA | 1301442 | 5/1992 |
| DE | 10331955 | 2/2005 |
| JP | 7266122 | 10/1995 |
| JP | 9174327 | 7/1997 |
| JP | 2000005926 | 1/2000 |
| JP | 2003205422 | 7/2003 |
| JP | 2006263838 | 10/2006 |

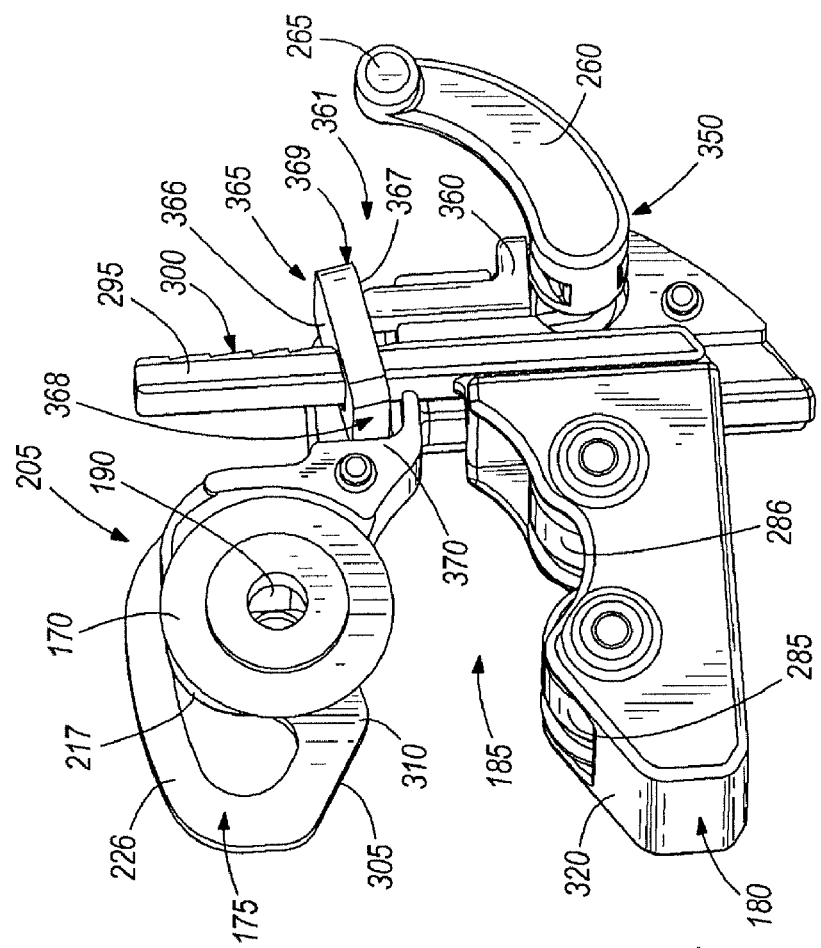
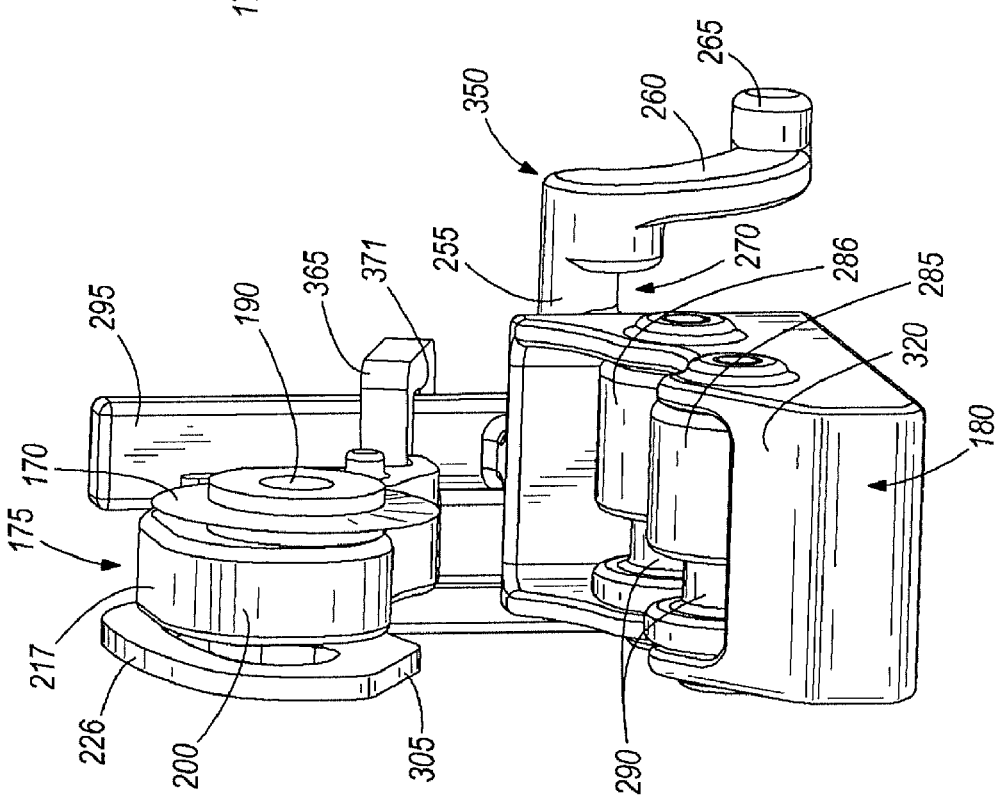

PIPE CUTTER

CROSS-REFERENCE TO RELATED APPLICATIONS

The present patent application claims priority to U.S. Provisional Patent Application Ser. No. 60/895,062, titled "PIPE CUTTER" filed on Mar. 15, 2007, and also claims priority to U.S. Provisional Patent Application Ser. No. 60/990,862, titled "PIPE CUTTER" filed on Nov. 28, 2007, the entire contents of both are hereby incorporated by reference.

BACKGROUND OF THE INVENTION

The present invention relates generally to a cordless power tool and more specifically, to a battery-powered pipe cutter.

Power-operated pipe cutters perform cutting operations in a variety of manners, many of which are largely automated. However, these methods of cutting oftentimes require manual intervention at some point during the cutting process, including, for example, loading a pipe within the pipe cutter, adjusting the pipe cutter to accommodate different pipe sizes, and applying a cutting force to the pipe. Such manual intervention can be time consuming and result in imperfect cuts.

SUMMARY OF THE INVENTION

In one embodiment, the invention provides a pipe cutter for cutting a pipe. The pipe cutter includes a cutting head assembly having a first carriage and a second carriage spaced apart to define a cutting area. The first carriage supports a cutting mechanism, and the second carriage is configured to support a pipe within the cutting area. The carriages have a locked state and an unlocked state such that when the carriages are in the unlocked state, the carriages are movable relative to each other and biased into the cutting area. The pipe cutter also includes a drive assembly configured to rotate the cutting head assembly and a locking mechanism configured for changing the carriages from the unlocked state to the locked state and for holding the carriages in the locked state. The locking mechanism includes an actuation member rotatably coupled to the first carriage. Rotation of the cutting head assembly causes rotation of the actuation member relative to the first carriage. The locking mechanism also includes a locking member configured for engagement with the first carriage and the second carriage upon rotation of the actuation member. Engagement of the locking member with the first carriage and the second carriage holds the carriages in the locked state.

In another embodiment, the invention provides a pipe cutter for cutting a pipe including a cutting head assembly having a first carriage and a second carriage spaced apart to define a cutting area. The first carriage includes a cutting mechanism and a biasing arm having a first portion and a second portion, wherein the first portion of the biasing arm supports the cutting mechanism. The second carriage is configured to support a pipe within the cutting area. The carriages have an unlocked state and a locked state for cutting the pipe. The pipe cutter also includes a drive assembly configured to rotate the cutting head assembly and an actuation member rotatably coupled to the second portion of the biasing arm. Upon rotation of the cutting head assembly, the actuation member rotates relative to the first carriage and deflects the biasing member toward the second carriage such that the first carriage is in the locked state and a force acts on the cutting mechanism to cut the pipe.

In yet another embodiment, the invention provides a pipe cutter for cutting a pipe. The pipe cutter includes a cutting head assembly having a first carriage that includes a cutting mechanism and a biasing arm. A second carriage is spaced apart from the first carriage to define a cutting area, and includes a support surface for supporting a pipe within the cutting area. The cutting head assembly also includes an over-center position for the pipe which is defined by the cutting mechanism and the support surface. The carriages have an unlocked state for inserting the pipe into the cutting area and a locked state for cutting the pipe such that when the first carriage is in the unlocked state the first carriage is movable relative to the second carriage and is biased into the cutting area. The cutting head assembly also includes a spring biasing the second carriage into the cutting area such that when the second carriage is in the unlocked state, the second carriage is movable relative to the first carriage. The pipe cutter also includes a drive assembly configured to rotate the cutting head assembly and a locking mechanism configured for moving the carriages from the unlocked state to the locked state and for holding the carriages in the locked state when the pipe is positioned in the over-center position. The locking mechanism includes an actuation member rotatably coupled to the first carriage such that rotation of the cutting head assembly causes rotation of the actuation member relative to the first carriage, and a locking member configured for engagement with the first carriage and the second carriage upon rotation of the actuation member. Engagement of the locking member with the first carriage and the second carriage holds the carriages in the locked state.

In still another embodiment, the invention provides a pipe cutter for cutting a pipe. The pipe cutter includes a housing having a cutting head portion and a handle portion, wherein a cutting head assembly is contained within the cutting head portion of the housing. The cutting head assembly includes a first carriage and a second carriage spaced apart to define a cutting area. The first carriage supports a cutting mechanism and includes a biasing arm having a first portion supporting the cutting mechanism and a second portion. The second carriage includes a support surface. The cutting mechanism and the support surface define an over-center position for the pipe. The carriages have an unlocked state and a locked state such that when the carriages are in the unlocked state, the carriages are movable relative to each other and biased into the cutting area. The pipe cutter also includes a spring biasing the second carriage into the cutting area and a drive assembly configured to rotate the cutting head assembly. The cutting head assembly further includes a cam member rotatably coupled to the second portion of the biasing arm such that rotation of the cutting head assembly causes rotation of the cam member relative to the first carriage, and a locking member configured for engagement with the first carriage and the second carriage upon rotation of the cam member. Engagement of the locking member with the carriages holds the carriages in the locked state. The cutting head assembly also includes an actuator member fixed relative to the cutting head assembly. The actuator member engages the cam member as the cutting head assembly rotates to rotate the cam member.

Other aspects of the invention will become apparent by consideration of the detailed description and accompanying drawings.

BRIEF DESCRIPTION OF THE DRAWINGS

FIG. 10 is a front perspective view of the upper and lower carriages shown in FIGS. 6-9 with portions of the upper carriage removed to illustrate a cutting wheel.

FIG. 11 is a side perspective view of the upper and lower carriages shown in FIG. 10.

DETAILED DESCRIPTION

Figure 1:
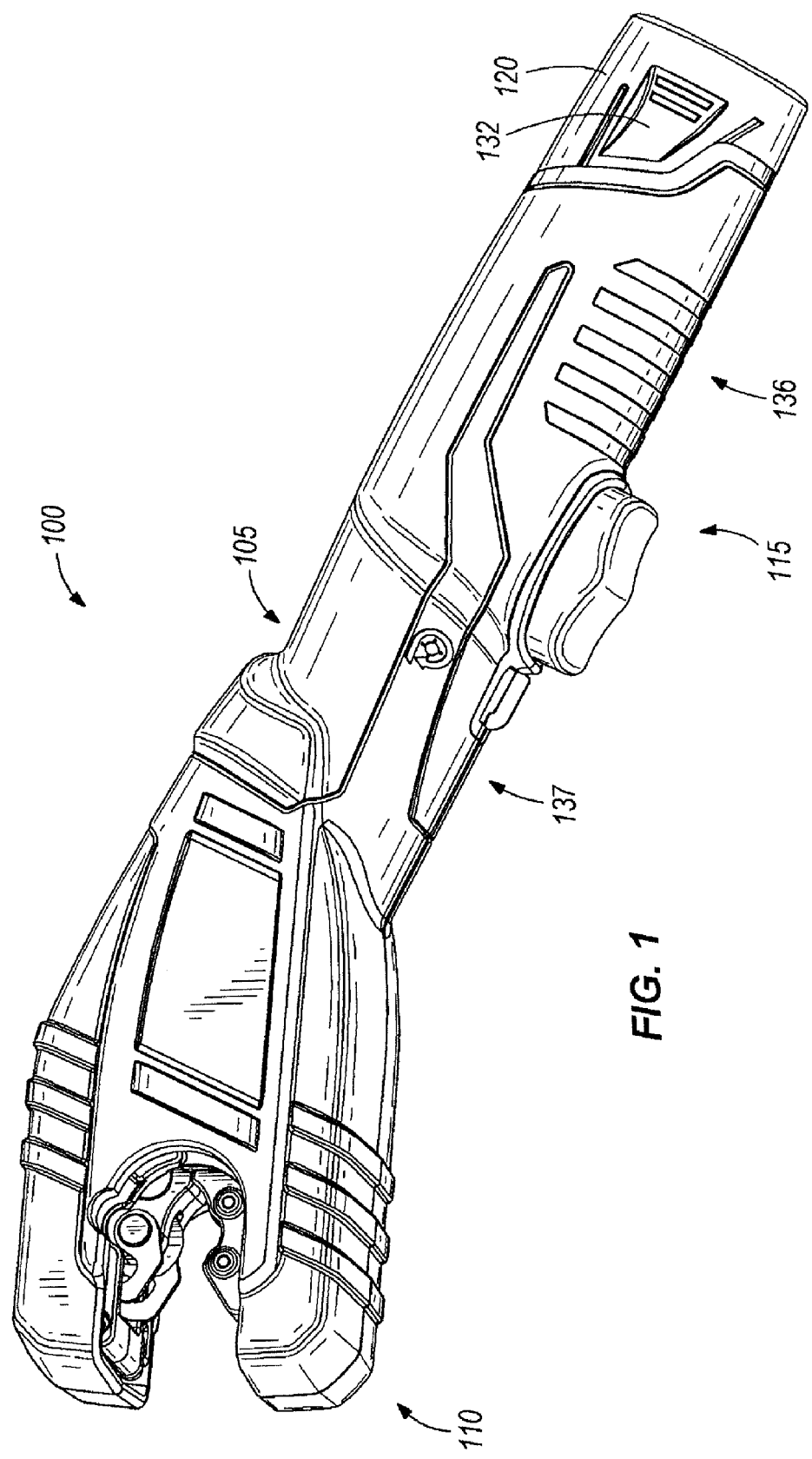
FIG. 1 is a perspective view of a pipe cutter according to one embodiment of the invention.

FIGS. 1-12 show a pipe cutter 100 according to one embodiment of the invention. The pipe cutter 100 is a handheld, battery-operated pipe cutter, although according to another embodiment, the pipe cutter 100 may be a corded pipe cutter. The pipe cutter 100 is configured to cut a variety of pipe sizes and materials. In the illustrated embodiment, the pipe cutter is configured to cut metal pipes having ⅜ inch through 1 inch nominal inner diameter (i.e., ½ inch to 1⅛ inch outer diameter). Such metal pipes may include any type of copper having thicknesses K, L, and M, electric metallic tubing (conduit) of ¾ inch and 1 inch, aluminum, brass, and other metal pipes.

The pipe cutter 100 includes a housing 105 having a forward portion 110 and a handle portion 115. The housing 105 forms an exterior of the pipe cutter 100 and contains various mechanical and/or electrical components of the pipe cutter 100. The housing 105 may be a hard plastic material, a metal material, and/or any other material or combination of materials suitable for containing the various components of the pipe cutter 100. The forward portion 110 includes components configured for conducting a cutting function of the pipe cutter 100 and includes an opening 106 for receiving a pipe. The handle portion 115 is configured to be gripped by a user with one or two hands. The handle portion 115 also houses, supports, or is coupled to a variety of mechanical or electrical components of the pipe cutter 100.

In the illustrated embodiment, the handle portion 115 includes a battery pack 120, a switch assembly 125, and a motor 130. The pipe cutter 100 is operable to receive power from the battery pack 120. According to another embodiment, the pipe cutter 100 may be powered by an alternating current (AC) power provided via a corded plug electrically coupled to a wall outlet or any number of suitable powering options.

Figure 2A:
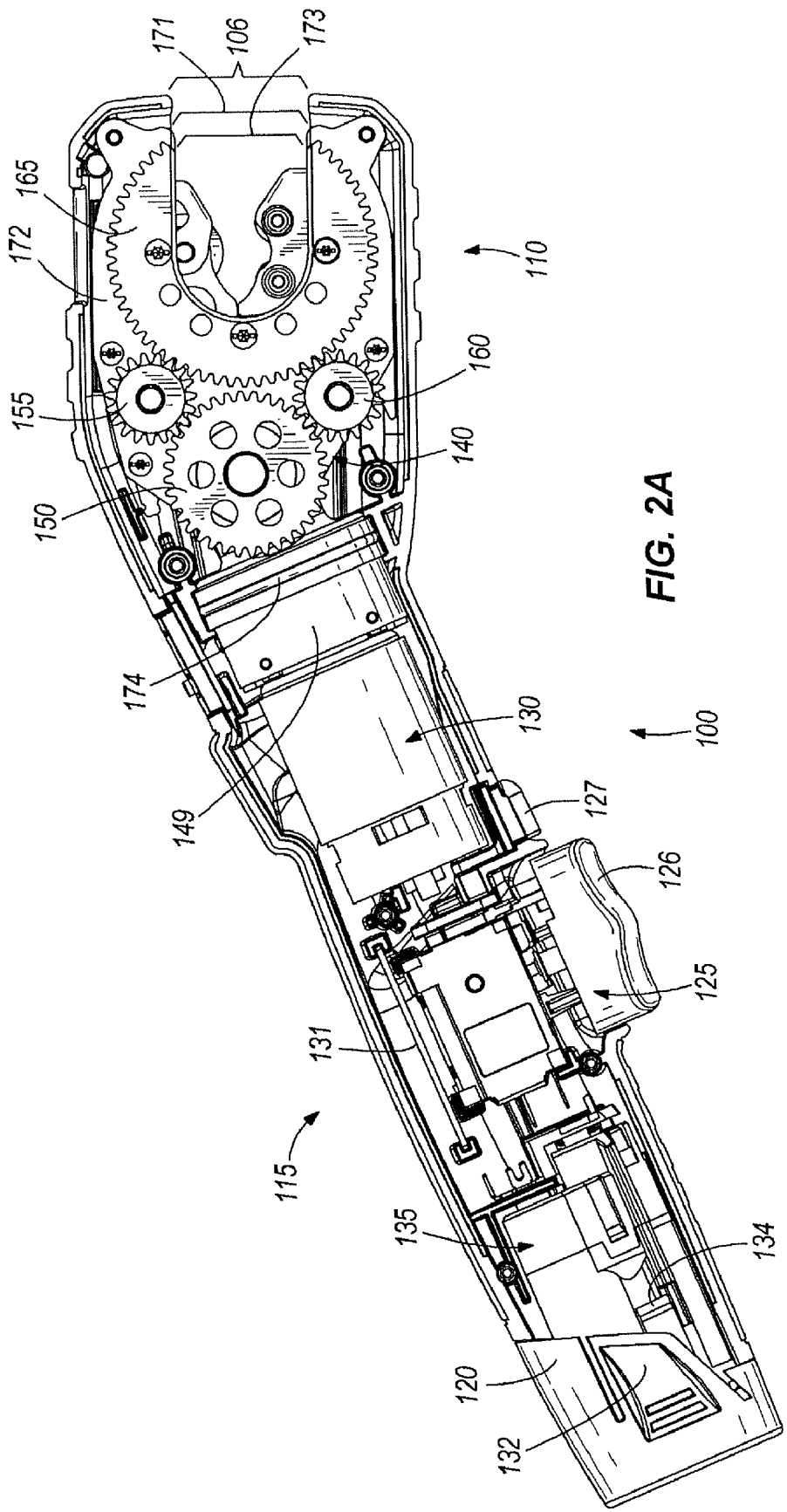
FIG. 2A is a side view of the pipe cutter shown in FIG. 1 with housing portions of the pipe cutter removed to illustrate internal gear mechanisms.
Figure 2B:
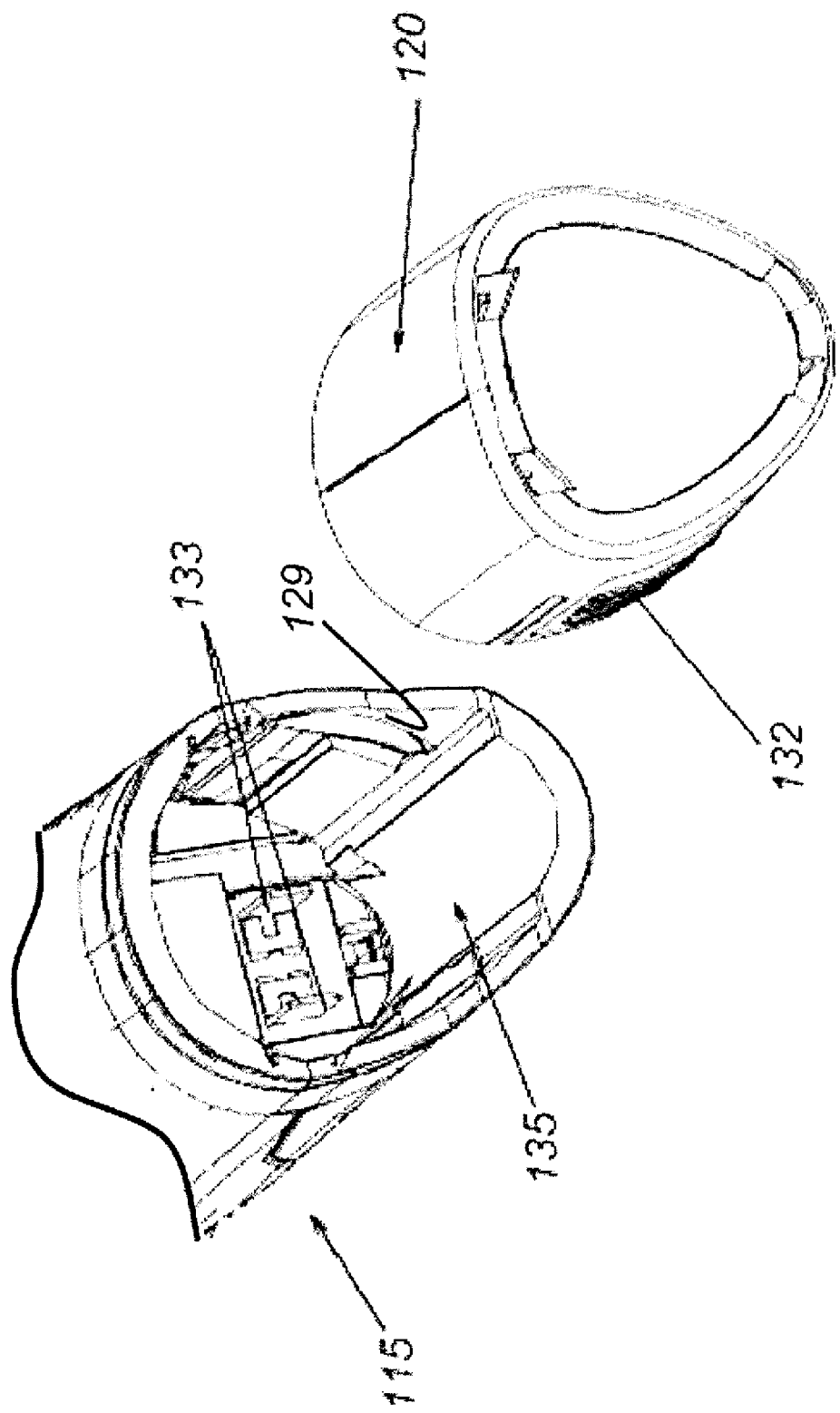
FIG. 2B is a perspective view of a handle portion of the pipe cutter shown in FIG. 1 with a battery pack disengaged from the pipe cutter.
Figure 3:
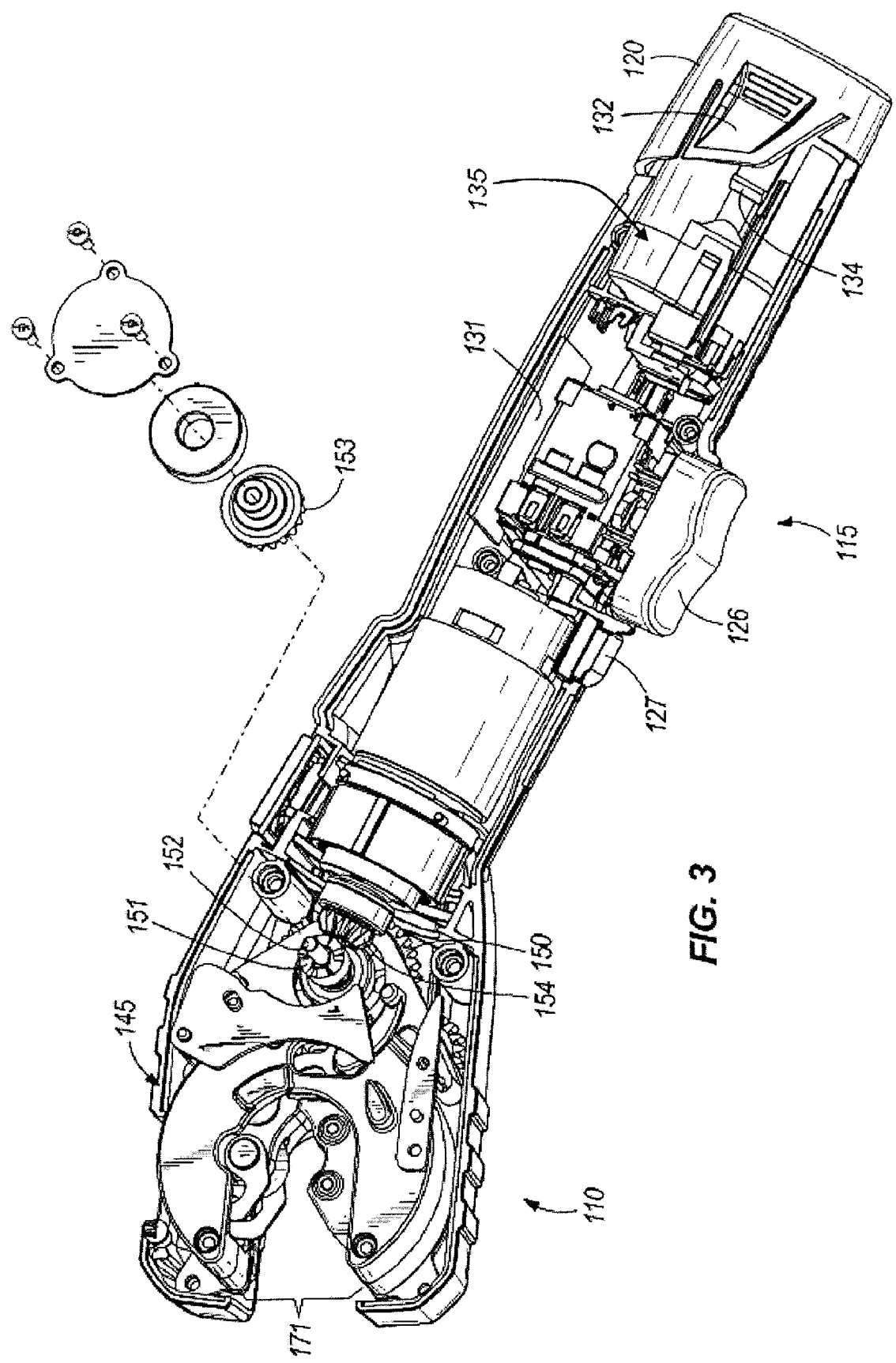
FIG. 3 is a perspective view of the pipe cutter shown in FIG. 1 with housing portions of the pipe cutter removed to illustrate a cutting head assembly.

As shown in FIGS. 1-3, the battery pack 120 is removably coupled to the handle portion 115 to provide power to the pipe cutter 100. In the illustrated embodiment, the battery pack 120 is supported within a battery chamber 135 extending through a rearward end of the handle portion 115 of the housing 105. The battery pack 120 includes receptacles (not shown) configured to connect to battery terminals 133 located within the battery chamber 135. When the battery pack 120 is disengaged from the battery chamber 135, as shown in FIG. 2B, the battery terminals 133 are exposed. The battery pack 120 generally conforms to the contour of the handle portion 115 such that, when the battery pack 120 is inserted into the battery chamber, the battery pack 120 helps define and increase the size of the handle portion 115. When inserted or coupled, the battery pack 120 provides power to the motor 130 through a control circuit 131 or may power the motor 130 directly. The control circuit 131 controls various aspects of the pipe cutter 100, the motor 130 and/or the battery pack 120 and may also monitor operation of the pipe cutter 100 and its components.

The battery pack 120 includes two actuators 132 to releasably secure the battery pack 120 in the chamber 135. Each actuator 132 is connected to a tab 134 that engages a corresponding recess 129 in the chamber 135 (FIG. 2B). Due to the resiliency of the material of the housing 105, the tabs 134 are biased away from the battery casing to engage the recesses. Depressing the actuators 132 moves the tabs 134 out of engagement with the corresponding recesses such that the battery pack 120 may be disconnected from the pipe cutter 100. This arrangement allows a user to quickly remove the battery pack 120 from the device 100 for recharging or replacement.

In the illustrated embodiment, the battery pack 120 is a twelve-volt (12V) rechargeable power tool battery pack. The illustrated battery pack 120 may include three (3) battery cells having, for example, a lithium (Li), lithium-ion (Li-ion), or other lithium-based chemistry. For example, the battery cells may have a chemistry of lithium-cobalt (Li—Co), lithium-manganese (Li—Mn) spinel, or Li—Mn nickel. In such embodiments, each battery cell may have a nominal voltage of about, for example, 3.6V, 4.0V, or 4.2V. In other embodiments, the battery cells may have a nickel-cadmium, nickel-metal hydride, or lead acid battery chemistry. In further embodiments, the battery pack 120 may include fewer or more battery cells, and/or the battery cells may have a different nominal voltage. In yet another embodiment, the battery pack 120 may be a dedicated battery housed (partially or entirely) within the pipe cutter 100. The battery pack 120 may also be configured for use with other cordless power tools, such as drills, screwdrivers, grinders, wrenches, and saws.

The pipe cutter 100 shown in the illustrated embodiment also includes a switch assembly 125, which is operable to electrically connect the motor 130 to the battery pack 120. The switch assembly 125 includes a push, power switch 126 and a pivoting, direction switch 127 positioned on the handle portion 115 of the housing 105. When actuated by a user, the power switch 126 activates the power supply 120 of the pipe cutter 100. The direction switch 127 is movable between three positions: a forward position and a reverse position for controlling the rotational direction of the motor 130 and a cutting head assembly 145, and a lock-out position for preventing inadvertent powering of the motor 130.

The handle portion 115 and the switch assembly 125 may be gripped by a user in a number of ways. Referring to FIG. 1, the handle portion 115 includes a dual position grip configured to accommodate two different one-handed grip styles, a lower grip position and an upper grip position. In a lower grip position, a user grasps a lower hand grip 136 such that the switch assembly 125 is located between the user's hand and the forward portion 110 of the pipe cutter 100. The user actuates the switch assembly 125 with an index finger of the same hand that is gripping the handle portion 115. In an upper grip position, the user grasps an upper hand grip 137 such that the user's hand is positioned between the switch assembly 125 and the forward portion 110 of the pipe cutter 100. The user actuates the switch assembly 125 with a ring finger or pinky finger of the same hand that is gripping the handle portion 115. The option of using the lower grip position and the upper grip position allows a user to adjust a grip to best suit individual hand size and strength and to accommodate for confined workspaces or pipe configurations. It should be readily apparent to those of skill in the art that a user may utilize a two-handed grip style with the handle portion 115 of the pipe cutter 100.

Referring to FIGS. 2A and 3, a drive assembly 140 is supported by the forward portion 110 of the housing 105. The drive assembly 140 is powered by the motor 130 and drives the cutting head assembly 145 to cut a pipe (not shown). In the illustrated embodiment, the motor 130 is drivingly coupled to gears (not shown) housed within a gear case 149. The gears are drivingly coupled to a bevel gear set, including a bevel gear 153 and a bevel pinion 154, which drives the drive assembly 140. In a further embodiment, the motor 130 is coupled to a gear reduction, such as a planetary gear reduction, with a pinion which couples to and drives a drive gear 150. In yet another embodiment, the motor 130 is coupled directly to the drive assembly 140.

The drive assembly 140 also includes a clutch, such as a clutch 151 (FIG. 3). The clutch cam 151 is driven by the bevel gear 153 and is slidably coupled to a drive axle 152 of the drive gear 150. The clutch 151 functions when the pipe cutter 100 is operated in a reverse direction and is configured to slip out of engagement with the bevel gear 153 when the amount of torque placed on the drive assembly 140 exceeds a certain threshold. This threshold is reached during reverse operation of the cutting head assembly 145 as the cutting head assembly is returned to its original "home" position and meets resistance to further rotation, as discussed below with respect to FIG. 5A. Meeting this resistance, the clutch 151 slips out of engagement with the bevel gear 153 and slides along the drive axle 152. Disengagement of the clutch 151 and the bevel gear 153 terminates rotation of the drive axle 152 and thus, terminates rotation of the entire drive assembly 140 and the cutting head assembly 145. In another embodiment, the drive assembly 140 includes a single two-direction clutch that operates in both forward and reverse directions.

As shown in FIG. 2A, the drive assembly 140 includes the drive gear 150, a first idler gear 155, a second idler gear 160, and a C-shaped head gear 165. The drive gear 150, the first idler gear 155, and the second idler gear 160 are mounted to a stationary frame 172, which is supported by the housing 105. The head gear 165 is coupled to the cutting head assembly 145 such that an opening 173 in the head gear 165 is aligned with an opening 171 in the cutting head assembly 145. In the illustrated embodiment, the first and second idler gears 155, 160 are spaced apart a distance such that at least one of the first and second idler gears 155, 160 is in contact with the head gear 165 at all times, even when the opening 173 of the head gear 165 rotates past the idler gears 155, 160.

The handle portion 115 of the housing 105 and the forward portion 110 of the housing 105 are separated by a seal 174 (FIG. 2A) that serves to waterproof the pipe cutter 100 for use in wet conditions. The seal 174 may take a variety of forms, such as an O-ring or other type of seal. In the illustrated embodiment, the seal 174 is an O-ring that prevents liquid from entering the pipe cutter 100 at any point rear of the drive assembly 140. The O-ring 174 is located in a circumferential groove formed in the gear casing 149. So that the pipe cutter 100 may be safely used in potentially wet conditions, the pipe cutter 100 components forward of the seal 174 may be formed of materials appropriate for use in water and resistant to excessive wear and tear under such conditions. In the illustrated embodiment, all components contained within the forward portion 110 of the housing 105 are formed of stainless steel or, in the case of a cutting wheel 170, aluminum.

Figure 4:
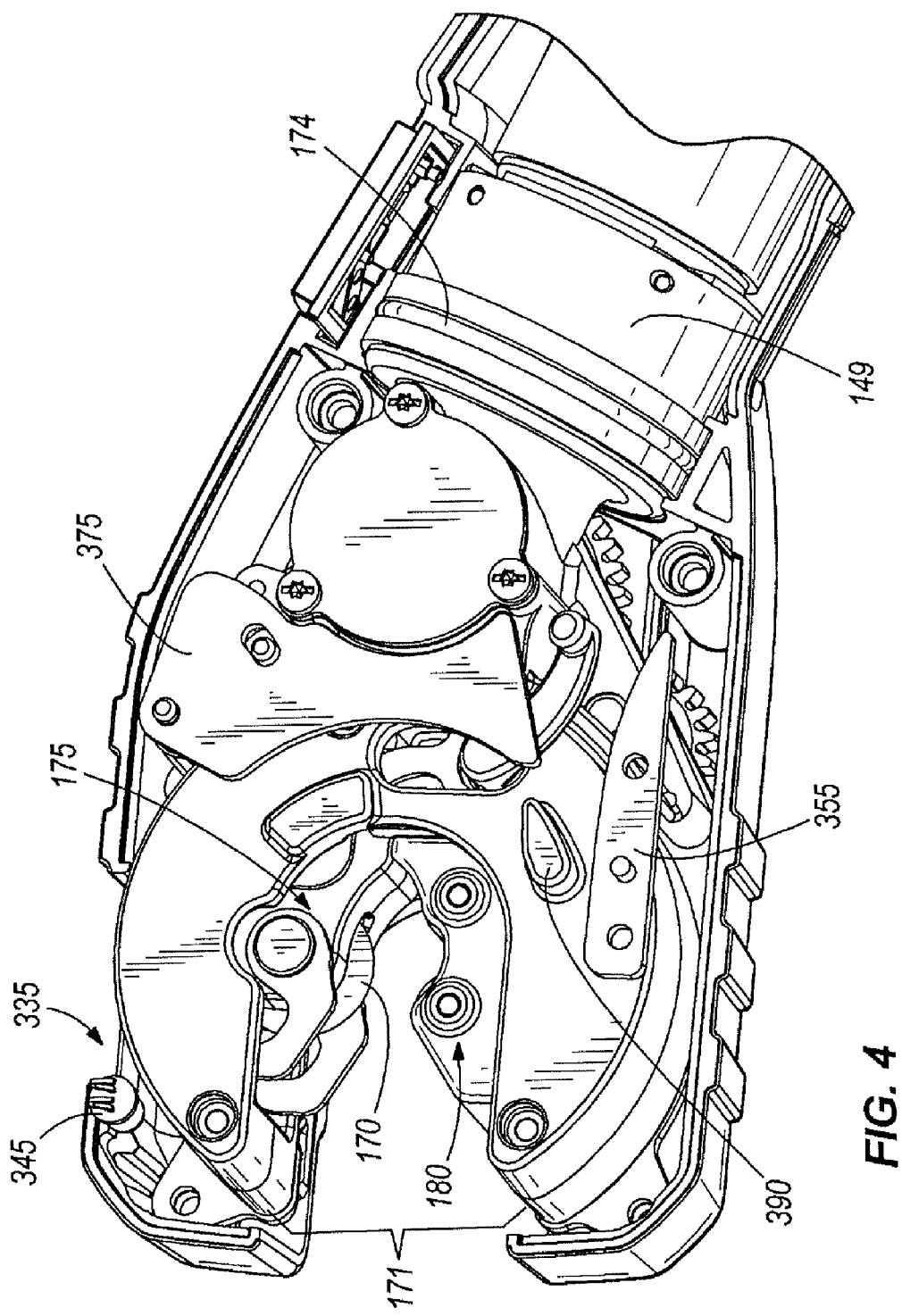
FIG. 4 is an enlarged view of the cutting head assembly shown in FIG. 3.

As shown in FIGS. 3-4, the cutting head assembly 145 is located in the forward portion 110 of the housing 105. FIGS. 5A-5D illustrate the cutting head assembly 145 with the housing 105 and the remainder of the pipe cutter 100 removed, and the cutting head assembly 145 in a variety of positions during a cutting operation. In the illustrated embodiment, the cutting head assembly 145 includes a cutting head housing 146, which contains an upper carriage 175 and a lower carriage 180. A space between the upper carriage 175 and the lower carriage 180 forms a cutting area 185 into which pipes of various sizes are inserted. In the illustrated embodiment, the upper carriage 175 and lower carriage 180 are configured to move independently of each other so that a pipe is inserted without having to preconfigure the size of the cutting area 185 for the pipe's diameter. The upper and lower carriages 175, 180 may be formed from a variety of materials including metal and plastic. Although the upper and lower carriages 175, 180 are configured to move independently, the carriages 175, 180 are coupled by one or more parts, couplers, fasteners, pivot points, etc. As shown in FIG. 6, the upper and lower carriages 175, 180 are slidably coupled together at a stem 295 of the lower carriage 180. Although the carriages 175, 180 are described as upper and lower carriages, it should be understood that they may be located relative to each other in a different manner. For example, the carriage described as the upper carriage 175 may be located in the position of the lower carriage 180 and vice versa.

In the illustrated embodiment, the upper carriage 175 includes the cutting wheel 170, such as a blade. The cutting wheel 170 is a sharp blade suitable for cutting pipe of various materials, including metal. The cutting wheel may be formed of various types of metal depending on the type of pipe to be cut, and may include abrasive particles. The illustrated cutting wheel 170 is circular, although the cutting tool may be formed in varying other shapes, such as an oval shape, a polygon, etc. The cutting wheel 170 may have a smooth and sharp edge, may have an uneven or asymmetrical edge with teeth or protrusions, or otherwise. In the illustrated embodiment, the cutting wheel 170 is formed of aluminum and has a circular shape with a smooth edge. The cutting wheel 170 includes a central aperture 190 (FIGS. 10-11). The central aperture 190 may be circular or have another shape. The cutting wheel 170 may be permanently fixed within the pipe cutter 100 or may be replaceable. The upper carriage 175 further includes an axle 195 that is coupled to the cutting wheel 170 at the aperture 190 and around which the cutting wheel 170 rotates.

Figure 7A:
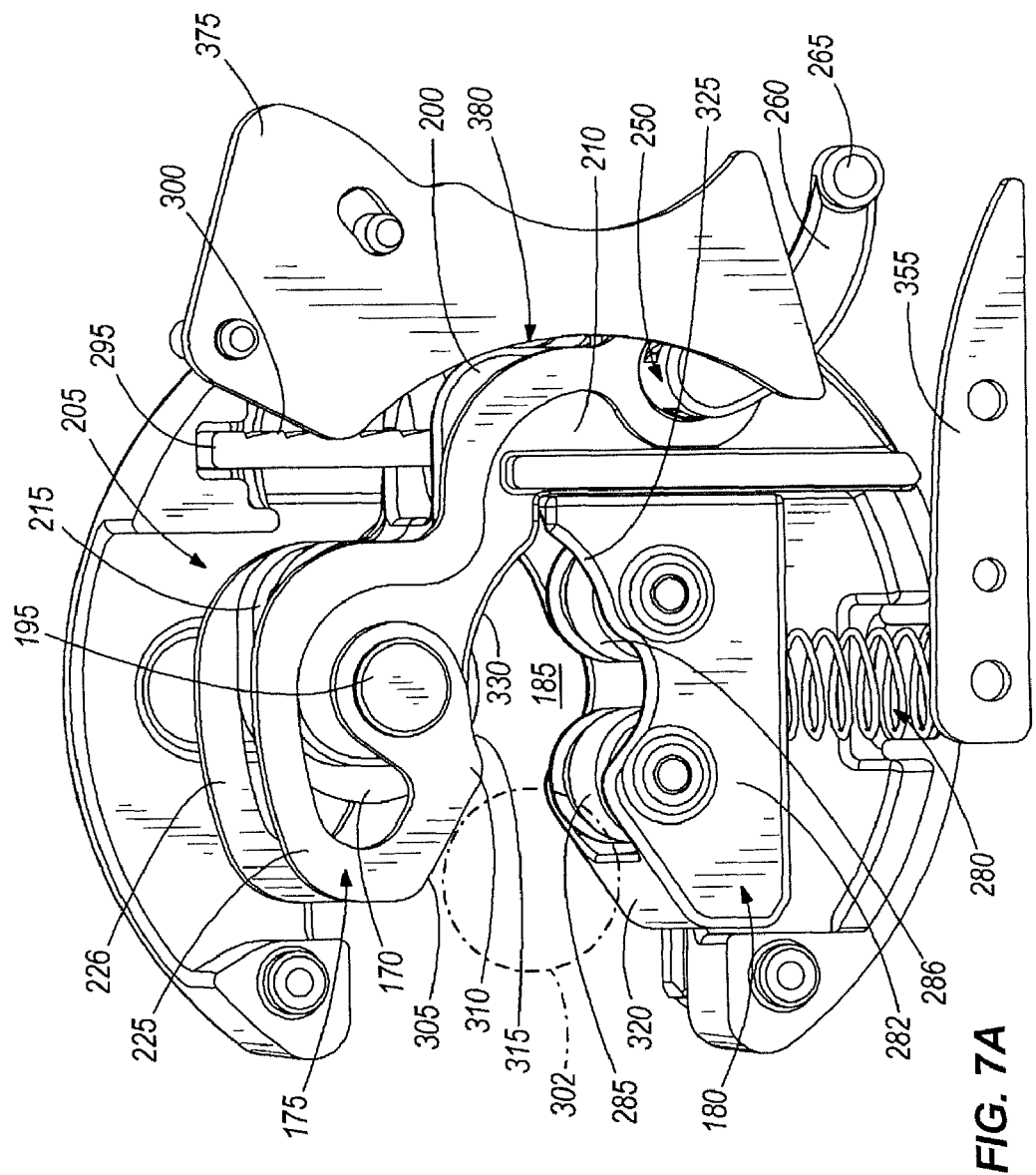
FIGS. 7A-7C illustrate the cutting head assembly shown in FIG. 4 during insertion of the pipe.
Figure 7B:
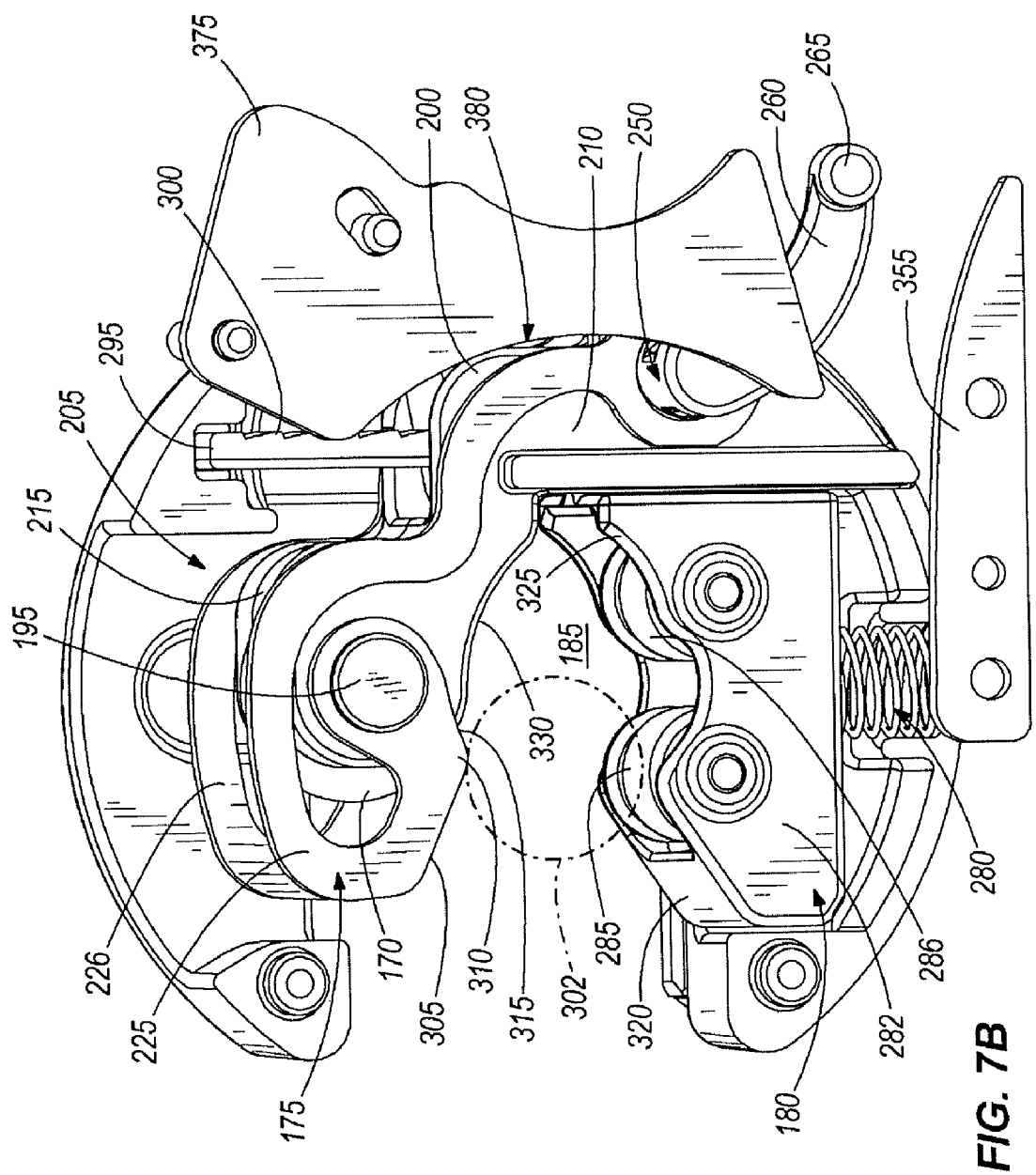
Figure 7C:
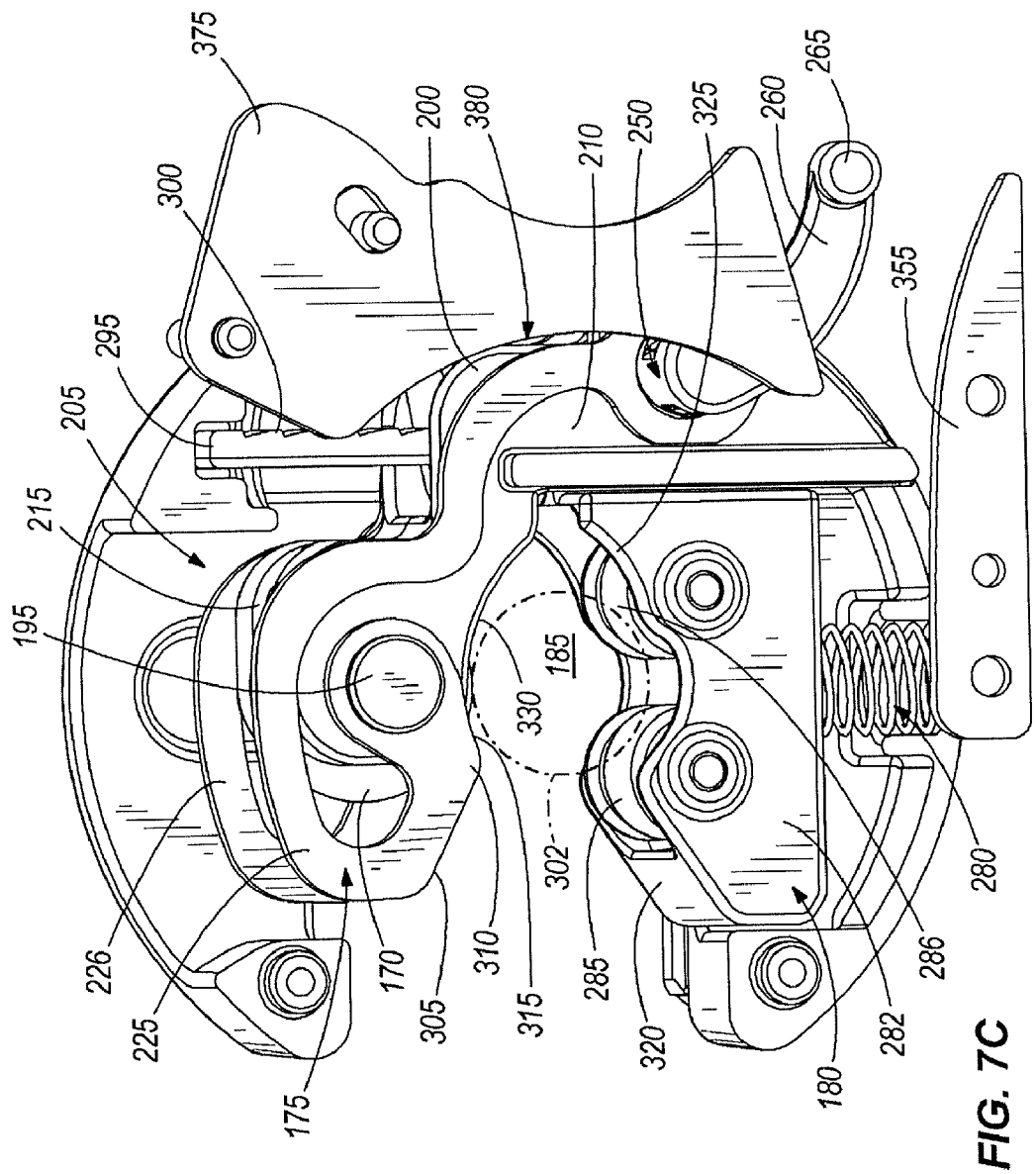
Figure 8:
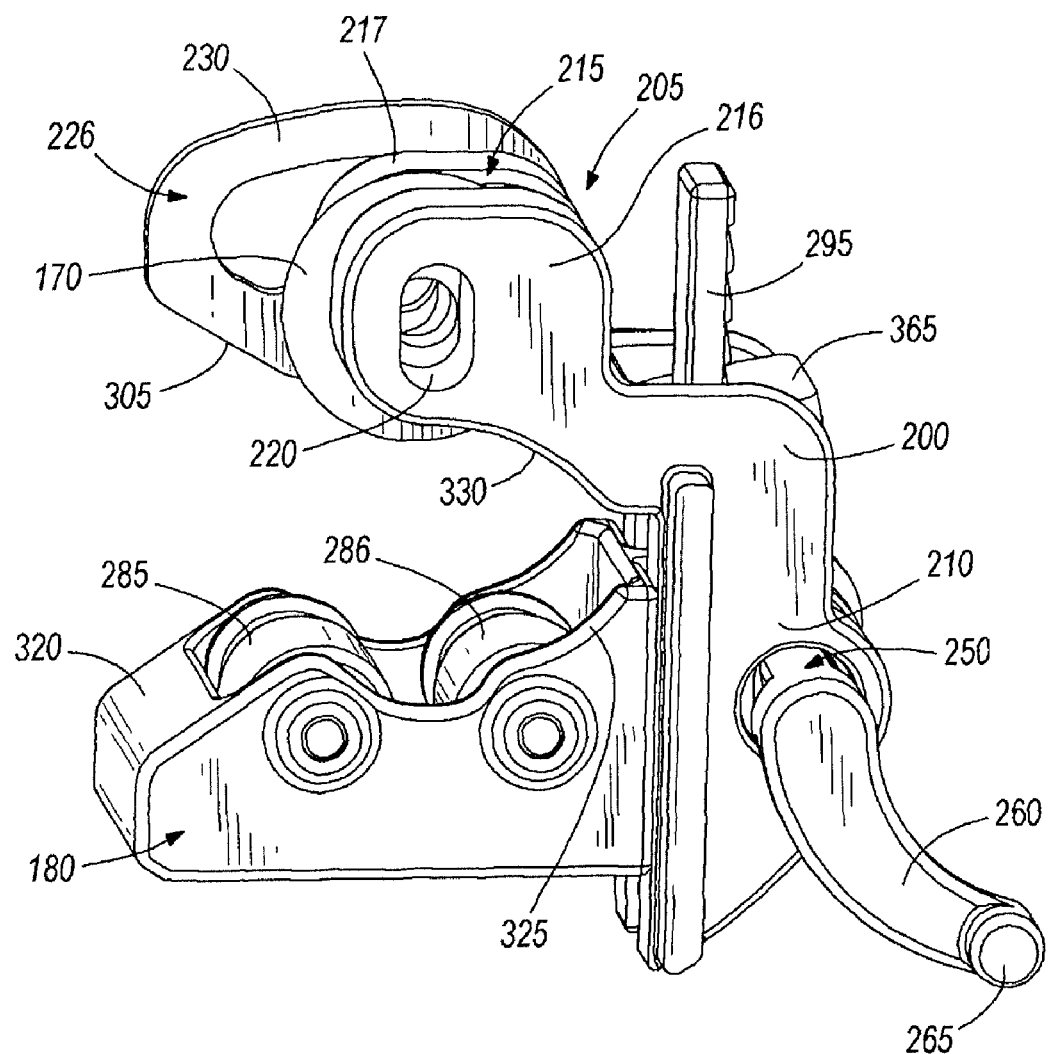
FIG. 8 is a perspective view of the upper and lower carriages shown in FIGS. 6-7C with portions of the upper carriage, including a spring, removed to illustrate an upper carriage body.

Referring to FIGS. 7A-7C and 8-11, the upper carriage 175 includes a body 200 configured to support the cutting wheel 170. The body 200 of the upper carriage 175 includes an upper body portion 205 and a lower body portion 210. The upper portion 205 of the upper carriage body 200 includes a space 215 separating a first upper body portion 216 and a second upper body portion 217 (FIG. 8). In the illustrated embodiment, the cutting wheel 170 is positioned within the space 215. The first and second upper body portions 216, 217 of the upper carriage body 200 each include an opening, such as a slot 220 (FIG. 8), in which the cutting wheel axle 195 rides. The slots 220 may be formed in a variety of shapes of sufficient size to support the axle 195. In the illustrated embodiment, the slots 220 are formed such that the cutting wheel axle 195 has sufficient room to move up and down within the slots 220, and thereby move toward and away from the lower carriage 180.

The upper carriage 175 includes one or more biasing mechanisms, such as springs 225, 226 shown in the illustrated embodiment. Each of the springs 225, 226 includes a first portion 230 and a second portion 235, whereby the first portions 230 include one or more apertures (not shown) aligned with the slots 220 of the upper carriage body 220 and through which the cutting wheel axle 195 is mounted. The cutting wheel 170 rides on the axle 195, which rests within the slots 220 of the upper carriage body 200 and the apertures of the first portions 230 of the first and second springs 225, 226.

Figure 9B:
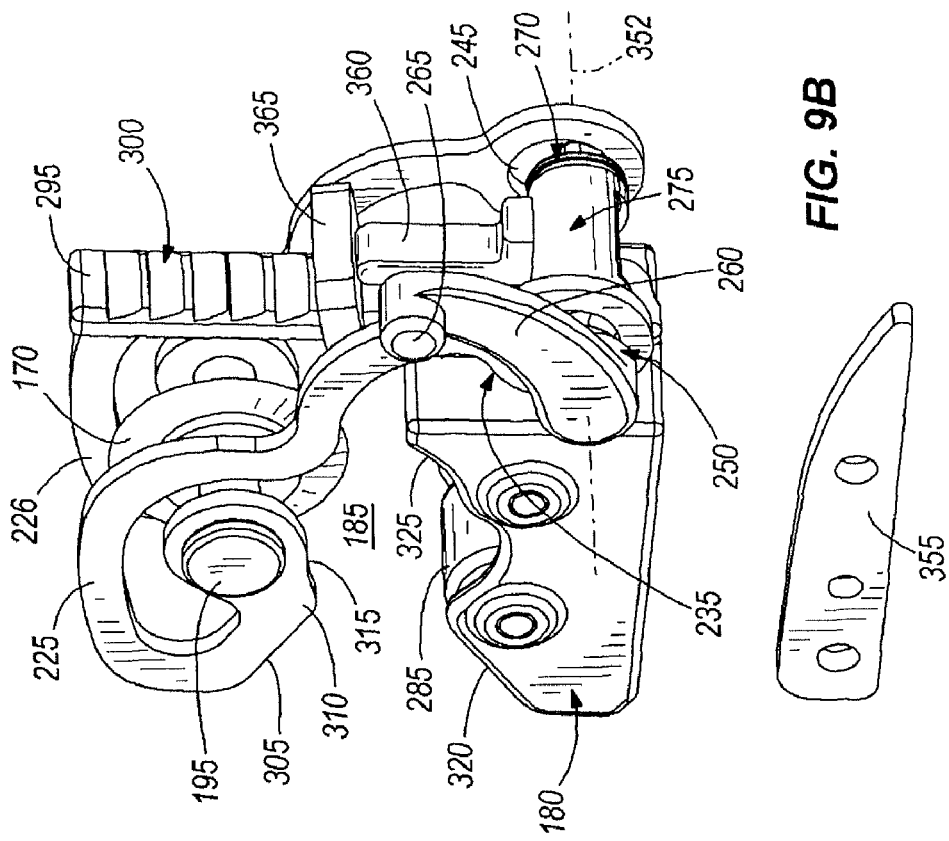
FIGS. 9A-9B are perspective views of the upper and lower carriages shown in FIGS. 6-8 with portions of the upper carriage body removed.
Figure 9A:
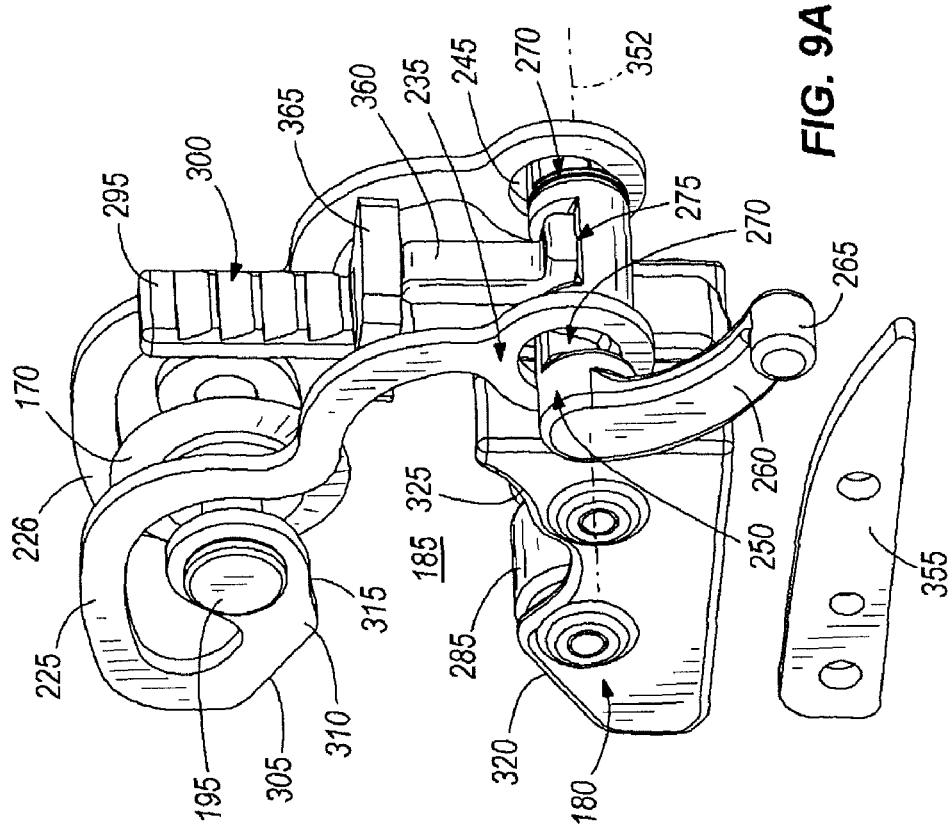

Each of the first and second springs 225, 226 includes an aperture 245 in the second portion 235. The apertures 245 are configured to receive and interact with a mechanical element of the upper or lower carriages 175, 180, such as a cam 250. In the illustrated embodiment, the upper carriage 175 includes a rotatable cam 250 having a cam shaft 255, a cam lever 260, and a cam post 265. As shown in FIGS. 9A and 9B, each of the second portions 235 of the springs 225, 226 includes the aperture 245 for receiving the cam shaft 255. The cam shaft 255 extends through the first spring 225, the second portion 210 of the upper carriage body 200 (FIG. 8), and the second spring 226. In the illustrated embodiment, the cam shaft 255 is a dual cam shaft that serves two functions, an automatic spring-loading function and an automatic locking function, as discussed below. The cam lever 260 extends from one end of the cam shaft 255 and terminates at the cam post 265. The cam shaft 255 has a generally cylindrical shape, and referring to FIG. 9A, includes first cam surfaces 270 and a second cam surface 275. The first cam surfaces 270 act on the springs 225, 226 to perform an automatic spring-loading function, and the second cam surface 275 acts on a lifter element 360 to perform an automatic locking function, as discussed below.

The lower carriage 180 is generally configured to provide a force against the pipe during pipe loading and pipe cutting activities. Referring to FIGS. 7A-7C, the lower carriage 180 is biased toward the upper carriage 175 and into the cutting area 185 by a spring 280, such as a light spring. It should be readily apparent to those of skill in the art that in a further embodiment the lower carriage 180 may be acted upon by any type of biasing element.

As shown in FIGS. 7A-7C, the lower carriage 180 includes a body 282 supporting rollers 285, 286, which define a support surface for a pipe. It should be noted that although two rollers are shown in the illustrated embodiment, one or more rollers or no rollers may be provided within the lower carriage 180 for defining a support surface. For example, the lower carriage 180 may include one or more surfaces, bumpers, or other structures configured to support and/or press against a pipe when a pipe is inserted into the cutting area 185.

The first and second rollers 285, 286 may be formed of a variety of materials, such as metal or plastic. In the illustrated embodiment, the first and second rollers 285, 286 are formed of stainless steel. The rollers may also be formed in a variety of shapes, although in the illustrated embodiment, the rollers 285, 286 are formed in generally cylindrical shapes. In the illustrated embodiment, circumferential grooves 290 (FIG. 10) are formed in the rollers to support a pipe with a flare fitting and allow a user to remove a flared end of a pipe while minimizing the length of pipe to be removed. The grooves 290 are located in an off-center position of each roller 285, 286 relative to the cutting wheel 170. The off-center location of the grooves 290 allows the flared end of a pipe to rest within the grooves 290 while the length of pipe is firmly supported by the first and second rollers 285, 286 during the cutting operation.

Referring to FIGS. 6, 8 and 9A, the upper carriage 175 receives a stem 295, or a support member, of the lower carriage 180 to slidably couple the upper and lower carriages 175, 180 together. The stem 295 extends from the lower carriage body 282, toward the upper carriage 175, and adjacent to a rear of the cutting area 185. The stem 295 may be integrally formed with the body 282 of the lower carriage 180 or may be a separate component coupled to the lower carriage body 282. The stem 295 includes one or more notches 300 spaced such that each notch corresponds to a pipe diameter, as discussed below.

As shown in FIGS. 7A-7C, the upper and lower carriages 175, 180 allow pipes having a variety of sizes to be quickly loaded into the pipe cutter 100 such that a pipe 302 is automatically aligned and supported within the cutting head assembly 145 prior to initiation of a cutting operation. To this end, the upper and lower carriages 175, 180 are biased toward each other and shaped so as to guide a pipe into the cutting area 185. The lower carriage 180 includes a forward portion having a forward angled surface 320 that extends toward the cutting area 185 and terminates along a centerline of the first roller 285. Each of the first and second springs 225, 226 include a forward angled surface 305 that extend to form a protrusion 310 on the lower surfaces of the springs 225, 226. The protrusions 310 are located opposite the first roller 285. Moving inward from the protrusions 310, each lower surface of the springs 225, 226 defines a second angled surface 315 extending away from the lower carriage 180 and to the rear of the cutting area 185.

As shown in FIG. 7A, the forward angled surface 305 of the first and second springs 225, 226 and the forward angled surface 320 of the lower carriage 180 cooperate to guide a pipe 302 into the cutting area 185. As such, the forward angled surfaces 305, 320 may be symmetrical. The protrusions 310 of the cutting springs 225, 226 cooperate with the first roller 285 (FIG. 7B) such that when the pipe 302 is forced past the protrusions 310 and the first roller 285, the pipe 302 reaches an over-center position (FIG. 7C). In the over-center position, the pipe 302 is centered between the first and second rollers 285, 286 of the lower carriage 180 and is aligned with the cutting wheel 170 of the upper carriage 175.

The upper and lower carriages 175, 180 include surfaces 325, 330 to prevent the pipe 302 from moving too far into the cutting area 185 such that it would no longer be supported between the first and second rollers 285, 286 and the cutting wheel 170, i.e., in the over-center position. As shown in FIGS. 7A-7C, a rear upper portion of the lower carriage 180 includes an angled surface 325 extending toward the upper carriage 175 and to the rear of the cutting area 185. Likewise, a portion of the upper carriage 175 located to the rear of the cutting area 185 includes an angled surface 330 extending toward the lower carriage 180 and to the rear of the cutting area 185.

In preparation for use of the pipe cutter 100, a user selects a pipe 302 to be cut and positions the pipe 302 within the cutting area 185. Prior to pipe insertion, the upper and lower carriages 175, 180 are independently and freely movable in an unlocked state. As the pipe 302 enters the cutting area 185, the pipe 302 presses against the forward angled surfaces 305, 320 of the upper and lower carriages 175, 180, as shown in FIG. 7A. The force of the pipe insertion overcomes the biases of the spring 280 on the lower carriage 180 and the springs 225, 226 on the upper carriage 175, thereby forcing the upper and lower carriages 175, 180 away from each other, as shown in FIG. 7B. The force of the pipe's insertion on the first and second springs 225, 226 also moves the cutting wheel axle 195 and cutting wheel 170, away from the lower carriage 180. The movement of the upper and lower carriages 175, 180 away from each other accommodates the specific diameter of the pipe 302 and allows the pipe 302 to move further into the cutting area 185. As the pipe 302 continues to move into the cutting area 185, the pipe 302 passes the protrusions 310 on the upper carriage 175 and the first roller 285 of the lower carriage 180 in a centered position. As the pipe 302 moves past the protrusions 310 and the first roller 285, the pipe 302 reaches an over-center position, as shown in FIG. 7C. When the pipe 302 reaches this over-center position, the upper and lower carriages 175, 180 snap onto the pipe 302 such that the pipe 302 is firmly supported between the rollers 285, 286 and the cutting wheel 170.

Figure 12:
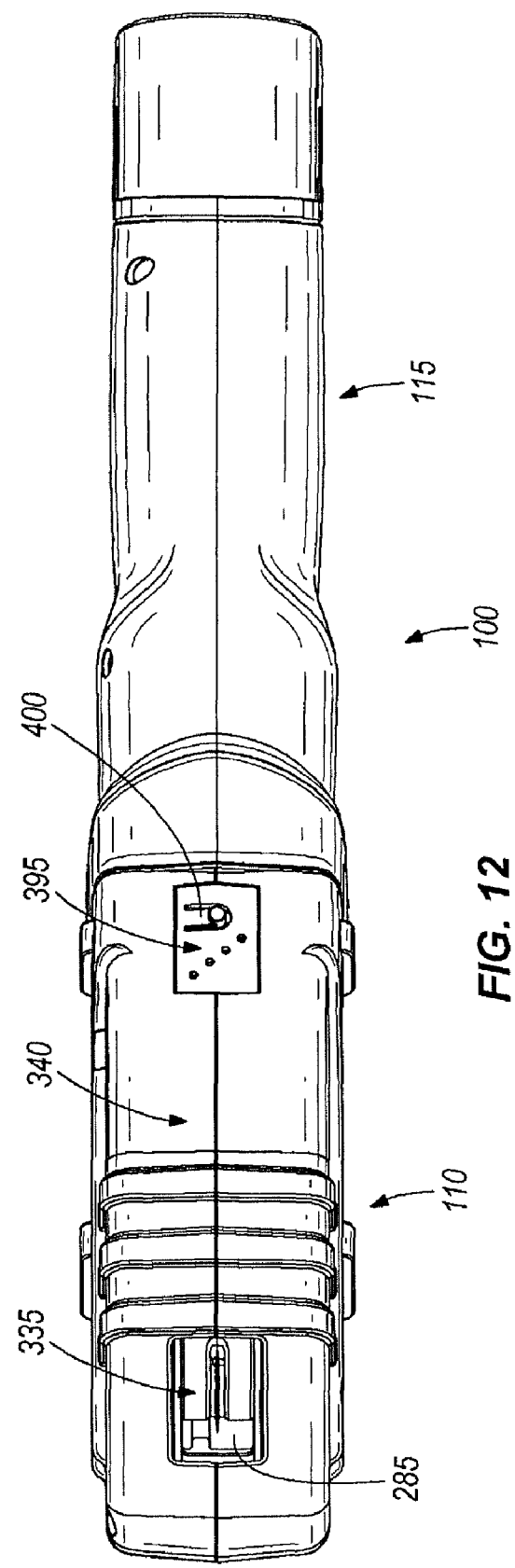
FIG. 12 is a top view of the pipe cutter shown in FIG. 1.

When inserting the pipe into the pipe cutter 100 as described above, the user may view the cutting area 185 through a sight window 335 (FIG. 12). In the illustrated embodiment, the pipe cutter 100 includes a sight window 335 located in a wall 340 of the housing 105 proximate the cutting head assembly 145. The sight window 335 allows a user to view the cutting area 185 of the pipe cutter 100 through the wall 340 of the housing 105. The cutting head assembly 145 includes an aperture 342 (FIGS. 5A-5D) aligned with the sight window 335 to continue the line of sight. The sight window 335 allows a user to properly align a pipe with the cutting wheel 170 and to observe the cutting process during use of the pipe cutter 100. The sight window 335 may be formed of a variety of materials, including Plexiglas, as shown in the illustrated embodiment, or other transparent materials suitable for use in a power tool. Alternatively, the sight window 335 may include an opening with no covering.

Referring to FIG. 4, the pipe cutter 100 includes a light source 345, such as an LED, to illuminate the cutting area 185. The light source 345 is located within the forward portion 110 of the housing 105 and adjacent to the sight window 335. The light source 345 is activated via a light switch (not shown). The light switch may be electrically coupled with or separate from the switch assembly 125 of the pipe cutter 100. The light switch may be configured to remain activated at all times during the operation of the pipe cutter 100 or only for a certain period of time, such as for 5 or 10 minutes. Alternatively, the light switch may be configured to be activated any time contact with a pipe is initiated by the cutting head assembly 145.

Once the pipe is located in the over-center position within the pipe cutter 100, the user may initiate the cutting process by activating the power supply 120 of the pipe cutter 100. To activate the power supply 120, the user moves the direction switch 127 into a forward position and engages the power switch 126. Activation of the power supply 120 of the pipe cutter 100 causes the motor 130 to drive the drive assembly 140 and, in turn, rotate the cutting head assembly 145.

Figure 5A:
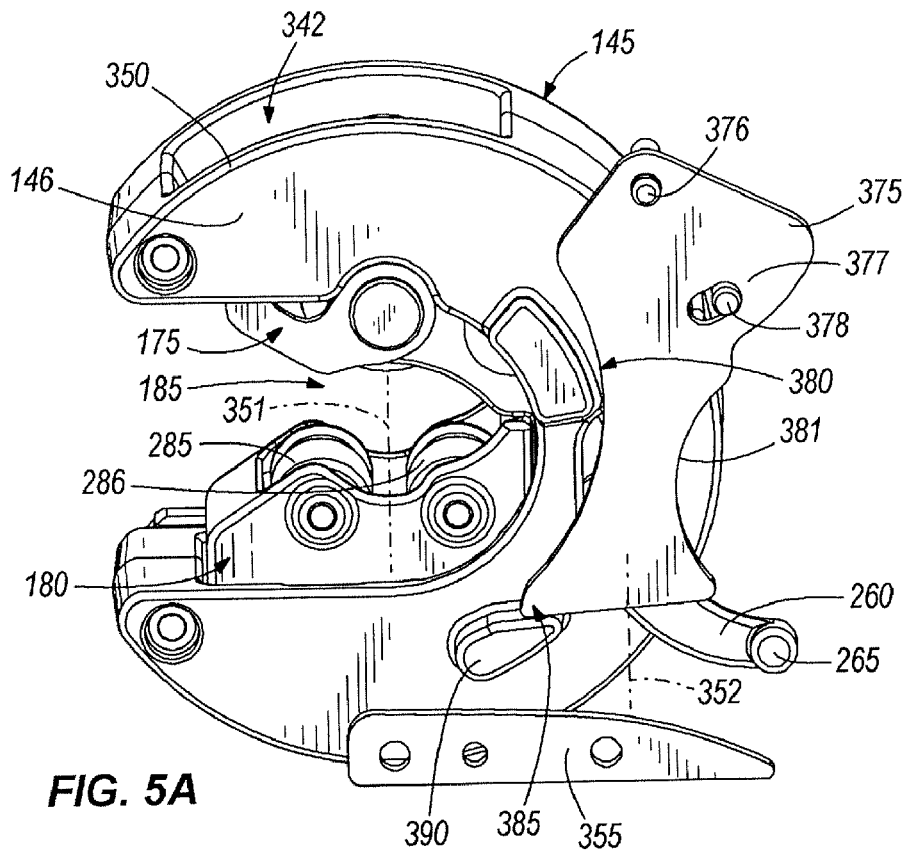
FIGS. 5A-5D illustrate various positions of the cutting head assembly shown in FIG. 4 during a cutting operation.
Figure 5B:
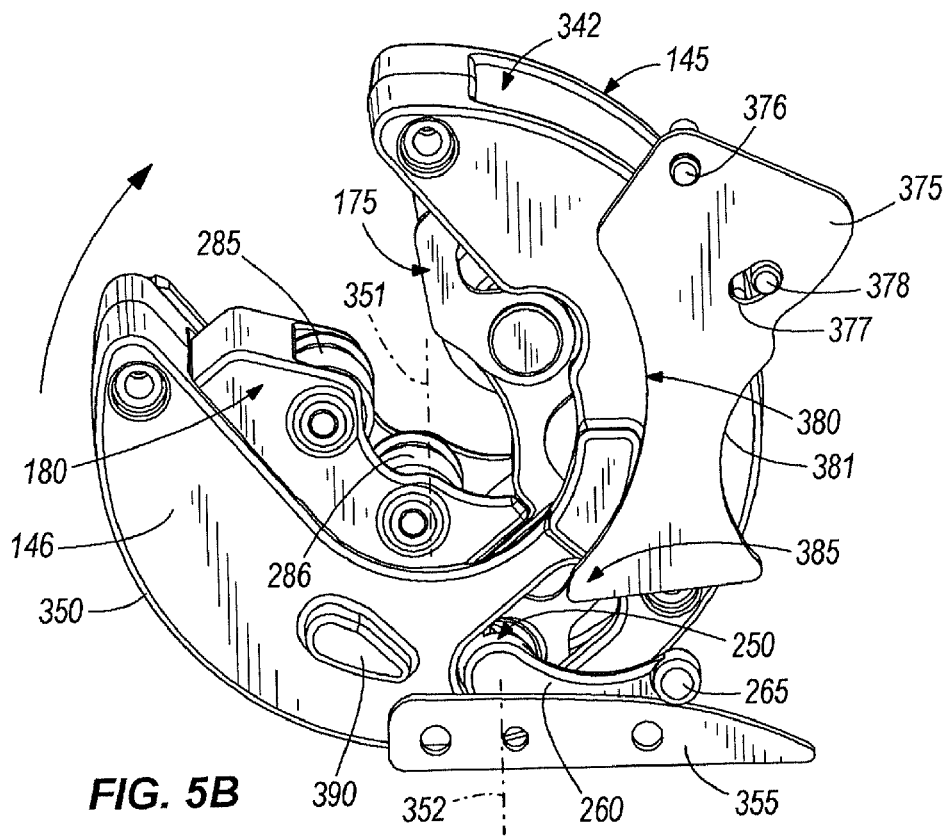
Figure 5C:
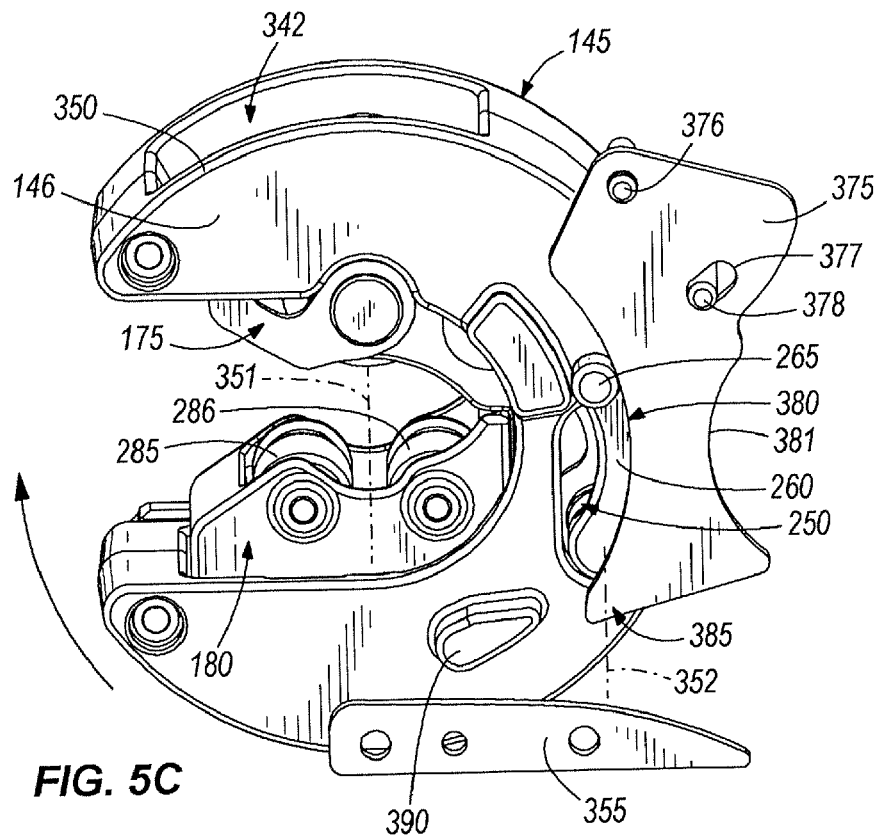
Figure 6:
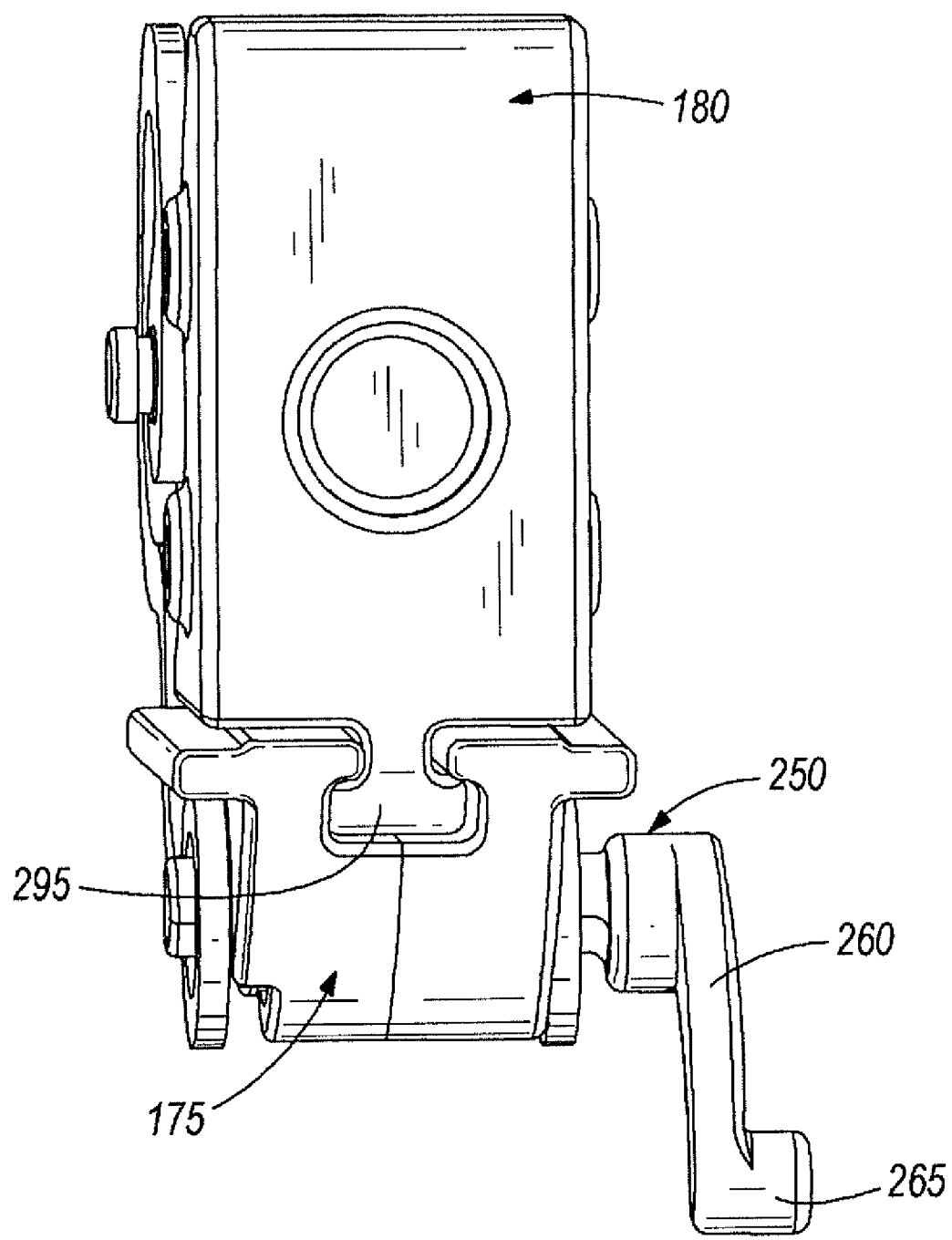
FIG. 6 is a bottom view of a portion of the cutting head assembly shown in FIG. 4.

Referring to FIG. 5A, the cutting head assembly 145 starts in an original home position in which the opening 173 of the head gear 165 is aligned with the opening 171 of the cutting head assembly 145 and the opening 106 of the housing 105. As the drive assembly 140 initially rotates the cutting head assembly 145 in a forward direction about an axis 351, the cam post 265 of the rotatable cam 250, engages an element fixed within the housing 105, such as a fixed cam or cam actuator 355 coupled to an interior of the forward portion 110 of the housing 105. Upon engagement of the cam post 265 with the cam actuator 355, the cam 250 rotates about an axis 352 such that the cam post 265 is forced toward an outer periphery 350 of the cutting head housing 146, as shown in FIG. 5B. The cam 250 continues to rotate about the axis 352 until the cam lever 260 is aligned with the outer periphery 350 of the cutting head housing 146, as shown in FIG. 5C, such that the cam 250 may move past the cam actuator 355.

Rotation of the cam 250 facilitates loading of the springs 225, 226 of the cutting head assembly 145. As shown in FIGS. 9A-9B, rotation of the cam 250 applies a load to the first and second springs 225, 226 by pulling the springs into the cutting area 185 and toward the lower carriage 180. As the cam 250 rotates, the first cam surfaces 270 pull the first and second springs 225, 226 toward the lower carriage 180. Loading of the springs 225, 226 applies a force to the cutting wheel axle 195, and consequently, to the cutting wheel 170 and the upper carriage body 200. Application of the load causes the cutting wheel axle 195 to translate within the slots 220 of the upper carriage body 200 and presses the cutting wheel 170 firmly against the pipe with force sufficient to cut the pipe.

Rotation of the cam 250 also locks the upper and lower carriages 175, 180 relative to each other in a position appropriate for the diameter of the inserted pipe. Prior to loading a pipe into the cutting area 185, the upper and lower carriages 175, 180 are in an unlocked state and are independently movable relative to each other (FIGS. 7A-7C, 9A, and 10). When the cam 250 rotates as described above with respect to FIGS. 5A-5C, the second cam surface 275 of the cam shaft 255 raises a lifter element 360 located within a lower portion 361 of the upper carriage 175 (FIGS. 9B and 11). The cam 250 raises the lifter element 360 into contact with a locking plate 365. The lifter element 360 includes a first portion that engages the cam shaft 255 and a second portion that engages the locking plate 365. As shown in FIGS. 10-11, the locking plate 365 is substantially planar and includes an upper surface 366, a lower surface 367, a forward portion 368, and a rearward portion 369. An aperture 371 extends through the upper and lower surfaces 366, 367 and is configured for receiving the stem 395.

When the carriages 175, 180 are in the unlocked state (FIGS. 9A, 10), the locking plate 365 is freely movable along a longitudinal axis of the stem 295. As the cam shaft 255 rotates, the lifter element 360 moves relative to the stem 295 and pushes against the rearward portion 369 of the locking plate 365 thereby pivoting the locking plate 365 about the stem 295 and the forward portion 368 toward the lower carriage 180. The pivoting action moves the upper surface 366 of the locking plate 365 into engagement with one of the stem notches 300 (FIGS. 9B, 11). Each of the notches 300 corresponds to a different pipe size. In the illustrated embodiment, the notches 300 are configured for ASTM B88 standard pipe sizes. In another embodiment (not shown), the notches 300 may be configured for ASTM B88 standard pipe sizes as well as EMT pipe sizes. In a further embodiment (not shown), the notches on the stem 295 may be eliminated to accommodate for any pipe size. In such an embodiment, the locking plate 365 would engage with the stem 295 and hold the stem 295 in place via friction. Pivoting movement of the locking plate 365 also moves the forward portion 368 of the locking plate 365 into engagement with a rear surface 370 of the upper carriage body 200 (FIG. 11). Engagement of the locking plate 365 with the upper carriage 175 and the stem 295 locks the carriages 175, 180 relative to each other in a locked state. In the locked state, the carriages 175, 180 rotate as one unit, which prevents the inserted pipe from wobbling during rotation of the cutting head assembly 145 and reduces the risk of cutting imperfections.

As shown in FIGS. 5A-5D, the cutting head assembly 145 also includes a stop lever 375, coupled to an interior portion of the housing 105. The stop lever 375 includes a curved first side edge 380 proximate the cutting area 185 and an opposite second side edge 381. Side edge 380 allows continued rotation of the cutting head assembly 145 without interference by the lever 375 (FIG. 5C). A lower corner 385 of the stop lever 375, where the curved side 380 terminates, operates to terminate rotation of the cutting head assembly 145, remove the load on the first and second springs 225, 226, and unlock the upper and lower carriages 175, 180. The stop lever 375 is coupled to the housing 105 at a pivot point 376. The stop lever 375 is biased to a first position, toward the cutting area 185 (FIG. 5A-5D), by a biasing mechanism, such as a torsion spring (not shown). The travel path of the stop lever 375 is defined by a slot 377 in the stop lever 375 and a pin 378 coupled to an interior portion of the housing 105 and extending through the slot 377.

As the cutting head assembly 145 continues to rotate through as many revolutions as necessary to complete the cut, the cam lever 260 remains aligned with the outer periphery 350 of the cutting head housing 146 such that the cam post 265 does not impede the rotation of the cutting head assembly 145. When the cutting head assembly 145 has rotated nearly 360 degrees from its original position, the cam post 265 contacts the stop lever 375 (FIG. 5C). Upon contact between the cam post 265 and the stop lever 375, the force of the contact overcomes the force of the lever torsion spring (not shown) to move the stop lever 375 away from the cutting area 185 and to a second position, as shown in FIG. 5C. With the stop lever 375 in this second position, the cam post 265 continues to move freely along the side edge 380 of the stop lever 375.

Figure 5D:
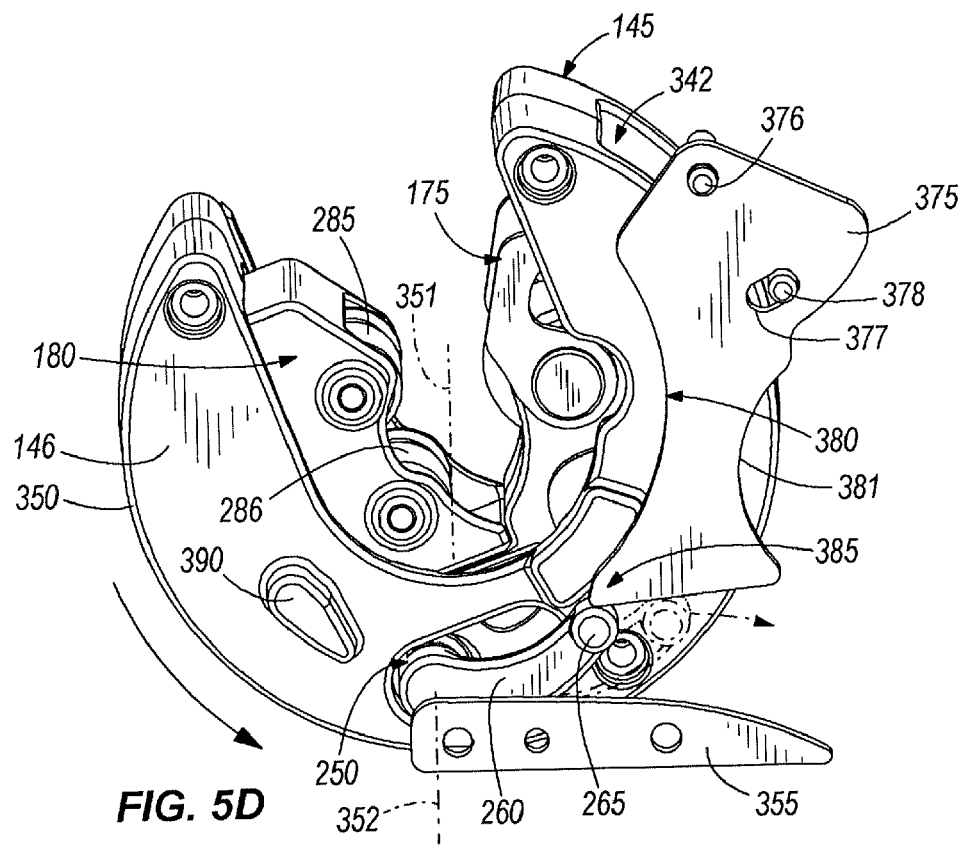

The cutting head assembly 145 continues to rotate until the cutting operation is complete. When a cutting operation is complete, the user activates the direction switch 127 to reverse the cutting head assembly 145 to the original "home" position (FIG. 5A) such that the pipe cutter 100 is ready to begin another cutting operation. As shown in FIG. 5D, during the rotation of the cutting head assembly 145 in the reverse direction, the cam post 265 engages the lower corner 385 of the stop lever 375. Upon engagement, cam 250 rotates until fully extended and back to the original home position shown in FIG. 5A, thereby releasing the load on the cutting springs 225, 226 and returning the upper and lower carriages 175, 180 to the unlocked state. Further rotation of the cutting head assembly 145 in the reverse direction, causes the stop lever 375, which is now in the first position, to engage a stop boss 390 located on the cutting head housing 146. As the stop lever 375 engages the stop boss 390 and provides resistance to further rotation, the clutch 151 slips out of engagement with the bevel gear 153 and thereby terminates further rotation of the drive assembly 140 and the cutting head assembly 145. At this point, the cutting head assembly 145 is positioned in its original home position, with the upper and lower carriages 175, 180 in the unlocked state to release the cut pipe from the cutting area 185 and accept another pipe to be cut.

The time required for cutting a pipe varies based upon at least a pipe diameter, a pipe thickness, or a pipe material. In the illustrated embodiment, the motor 130 of the pipe cutter 100 operates at between about 370 revolutions per minute (RPM) and about 390 RPM. The following chart provides examples of the average cut time (in seconds) and revolutions per cut for a variety of copper pipes that may be used with the pipe cutter.

| Pipe Type | ½" M | ½" L | ½" K | ¾" M | ¾" L | ¾" K | 1" M | 1" L | 1" K |
|---|---|---|---|---|---|---|---|---|---|
| Average Cut Time | 2.54 | 4.42 | 5.55 | 3.22 | 6.29 | 15.19 | 5.65 | 11.12 | 20.74 |
| Revolutions Per Cut | 12-16 | 21-28 | 27-36 | 15-20 | 30-40 | 74-98 | 27-36 | 54-72 | 101-134 |

Referring to FIG. 12, the pipe cutter 100 includes a fuel gauge 395 to assist a user in evaluating the remaining battery life. The fuel gauge 395 is located in an easily viewable region of the pipe cutter 100 on the housing 105. The fuel gauge 395 may be illuminated by one or more indicator lights, such as one or more light emitting diodes (LEDs). As shown in FIG. 12, the illustrated fuel gauge 395 displays four different indicators relating to four different battery lives. For example, four lit LEDs indicate a 100% battery life remaining, three lit LEDs indicates 75% battery life remaining, two lit LEDs indicate 50% battery life remaining, one lit LED indicates 25% battery life, and one flashing or blinking LED indicates a battery life of 10% or less. In some embodiments, a flashing or blinking LED may indicate to the user that the battery pack 120 needs to be charged or replaced. The fuel gauge 395 is selectively activated by a switch 400, or may remain illuminated at all times during the operation of the pipe cutter 100.

Figure 13:
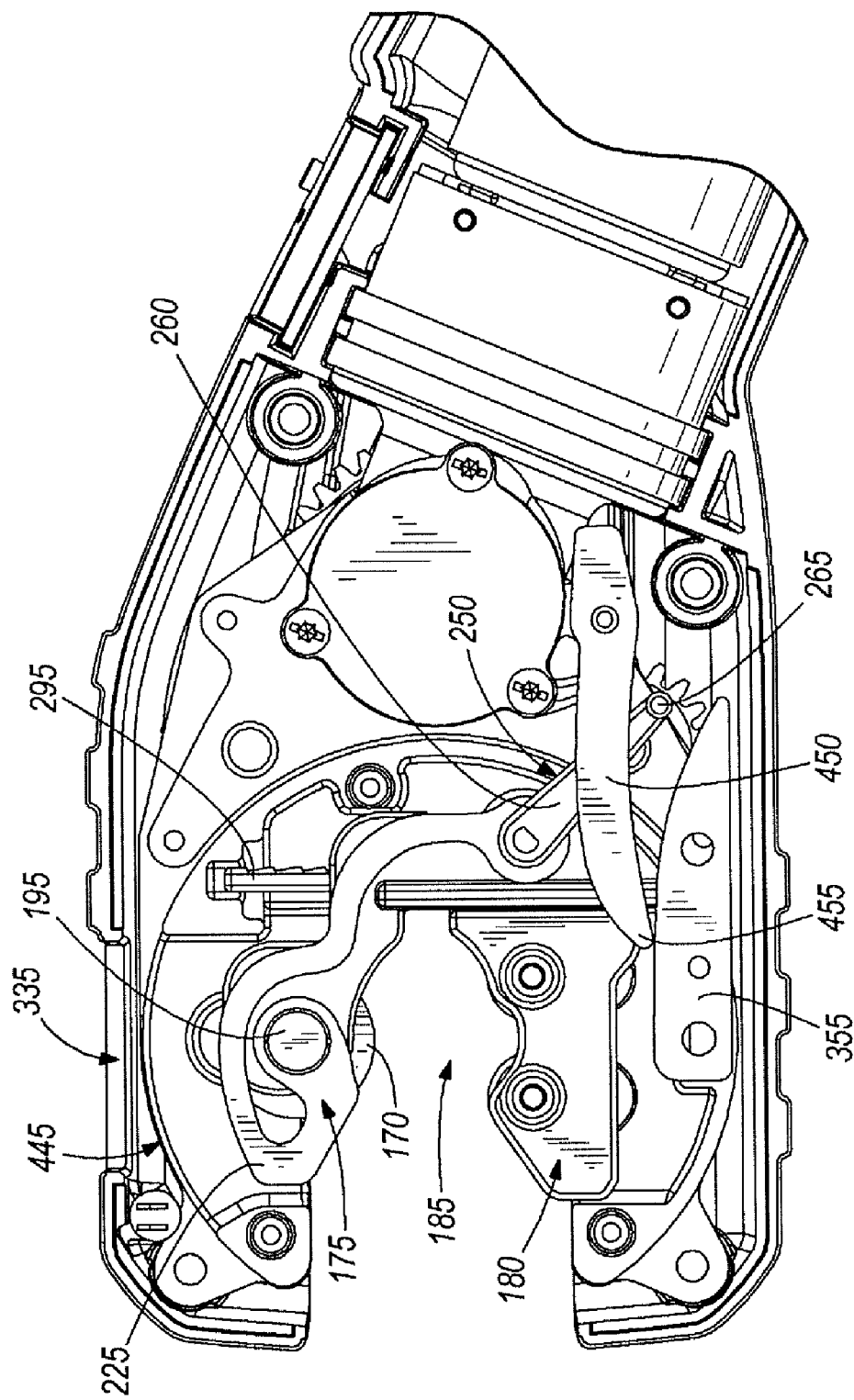
FIG. 13 is side view of a cutting head portion of another embodiment of a pipe cutter with housing portions of the pipe cutter removed to illustrate a cutting head assembly.
Figure 14:
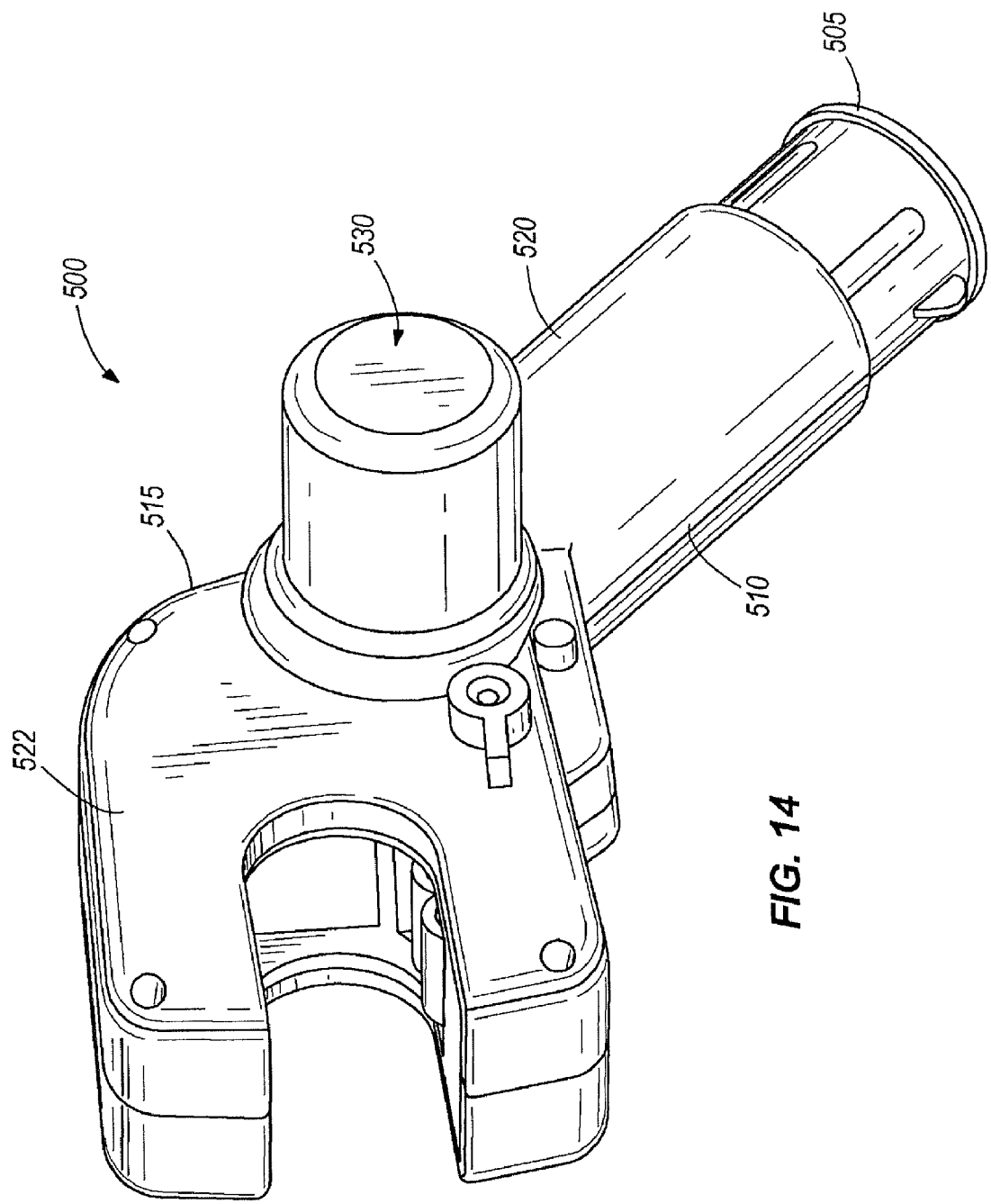
FIG. 14 is a perspective view of a pipe cutter according to yet another embodiment of the invention.

FIG. 13 illustrates another embodiment of a cutting head assembly 445. The cutting head assembly 445 is similar to and operates similarly to the cutting head assembly 145 shown in FIGS. 1-11; therefore, like structure will be identified by the same reference numerals. The cutting head assembly 445 includes one or more additional mechanisms configured to interact with the cam lever 260 and cam post 265 during rotation.

As shown in FIG. 13, when the cutting head assembly 445 begins to rotate, the cam lever 260 engages the cam actuator 355, as discussed above, and engages a movable lever 450. The movable lever 450 replaces the stop lever 375 of the previous embodiment. In the illustrated embodiment, the movable lever 450 is spring-biased away from the upper and lower carriages 175, 180. As the cam lever 260 moves into alignment with the cutting head assembly 445 (as discussed above with respect to FIGS. 5A-5B), the cam lever 260 rotates the movable lever 450 toward the upper carriage 175 until the cam lever 260 is able to move past the movable lever 450 and the cam actuator 355. With the cam lever 260 aligned with the cutting head assembly 445, the cutting head assembly 445 continues to rotate. When the cutting process is completed, a user moves the direction switch to a reverse mode to return the cutting head assembly 445 to the home position. As the cutting head assembly 145 moves in the reverse direction, the cam lever 260 engages a tip 455 of the movable lever 450. The engagement forces the movable lever 450 to rotate toward the upper carriage 175 and forces the cam lever 260, and consequently, the cam 250, to rotate out of alignment with the cutting head assembly. The rotation removes the load from the first and second springs 225, 226 and unlocks the upper and lower carriages 175, 180.

FIGS. 14-21 illustrate a pipe cutter 500 according to another embodiment of the invention. Similar to the previously described embodiments, the pipe cutter 500 receives power from a battery 505. The pipe cutter 500 includes a housing assembly 510 including a body 515 and a handle portion 520. The body 515 defines a forward portion 522 that supports a cutting head assembly 525. The body 515 of the pipe cutter 500 also includes a motor 530. The operation of the battery powered motor is implemented in a similar fashion to that of the previous embodiments, including a control circuit 532.

Figure 15:
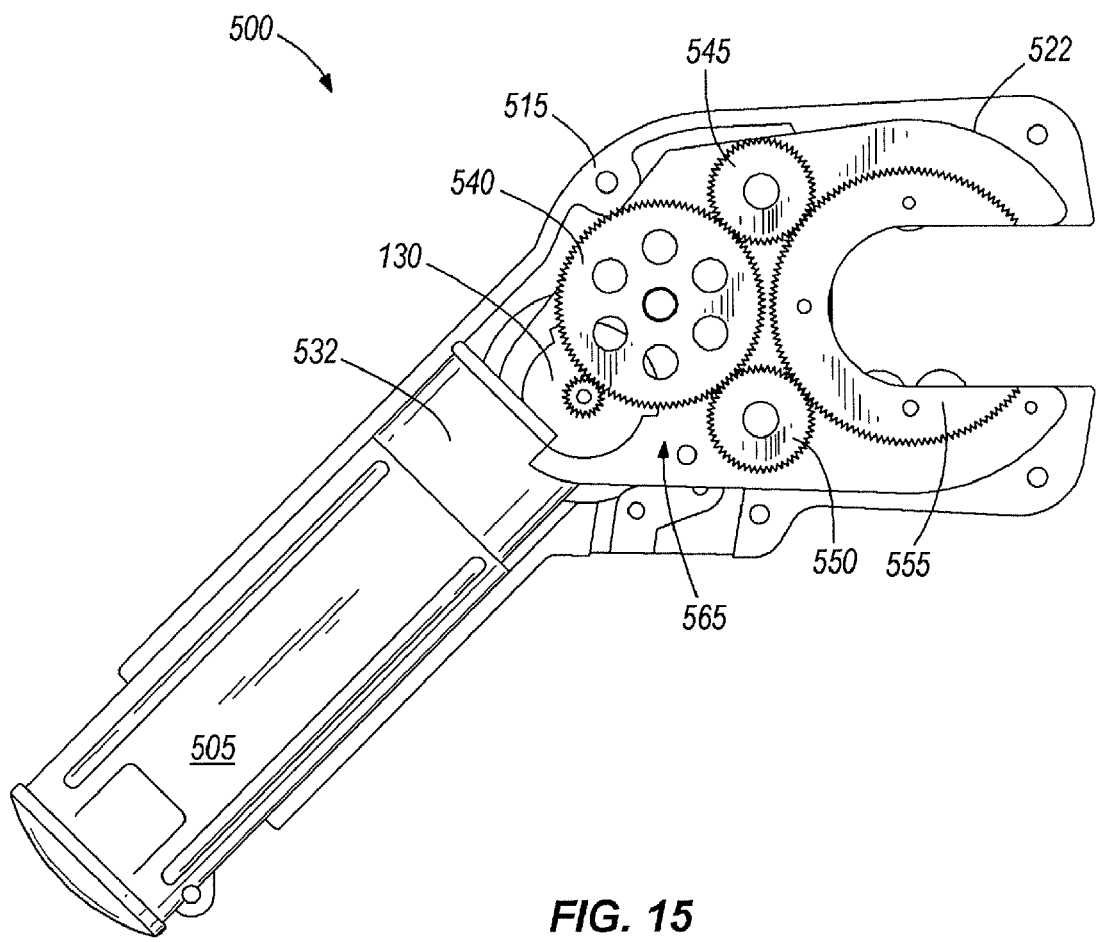
FIG. 15 is a side view of the pipe cutter shown in FIG. 14 with housing portions of the pipe cutter removed to illustrate a drive assembly.

As shown in FIG. 15, pipe cutter 500 includes a drive assembly 535, such as the drive assembly 140 described with respect to FIG. 2A. The drive assembly 535 includes a drive gear 540, a first idler gear 545, a second idler gear 550, and a head gear 555. Similar to previously discussed embodiments, the drive assembly 535 operates to rotate a cutting head assembly 525, which in turn, causes a cutting carriage 560 to facilitate the cutting operation.

A cutting head assembly 525 and portions of the cutting head assembly 525 are shown in FIGS. 16-21. In these embodiments, the cutting head assembly 525 is configured to receive and cut pipes of various sizes, thicknesses and materials. For example, in the illustrated embodiment, the cutting head assembly 525 accommodates ½" diameter pipe (designated with reference number 565), ¾" diameter pipe (designated with reference number 570) and 1" diameter pipe (designated with reference number 575). In other embodiments, the cutting head assembly 525 may be configured to receive and cut a fewer or greater number of pipe sizes than shown and described and/or different pipe sizes and thicknesses than shown and described.

Figure 16:
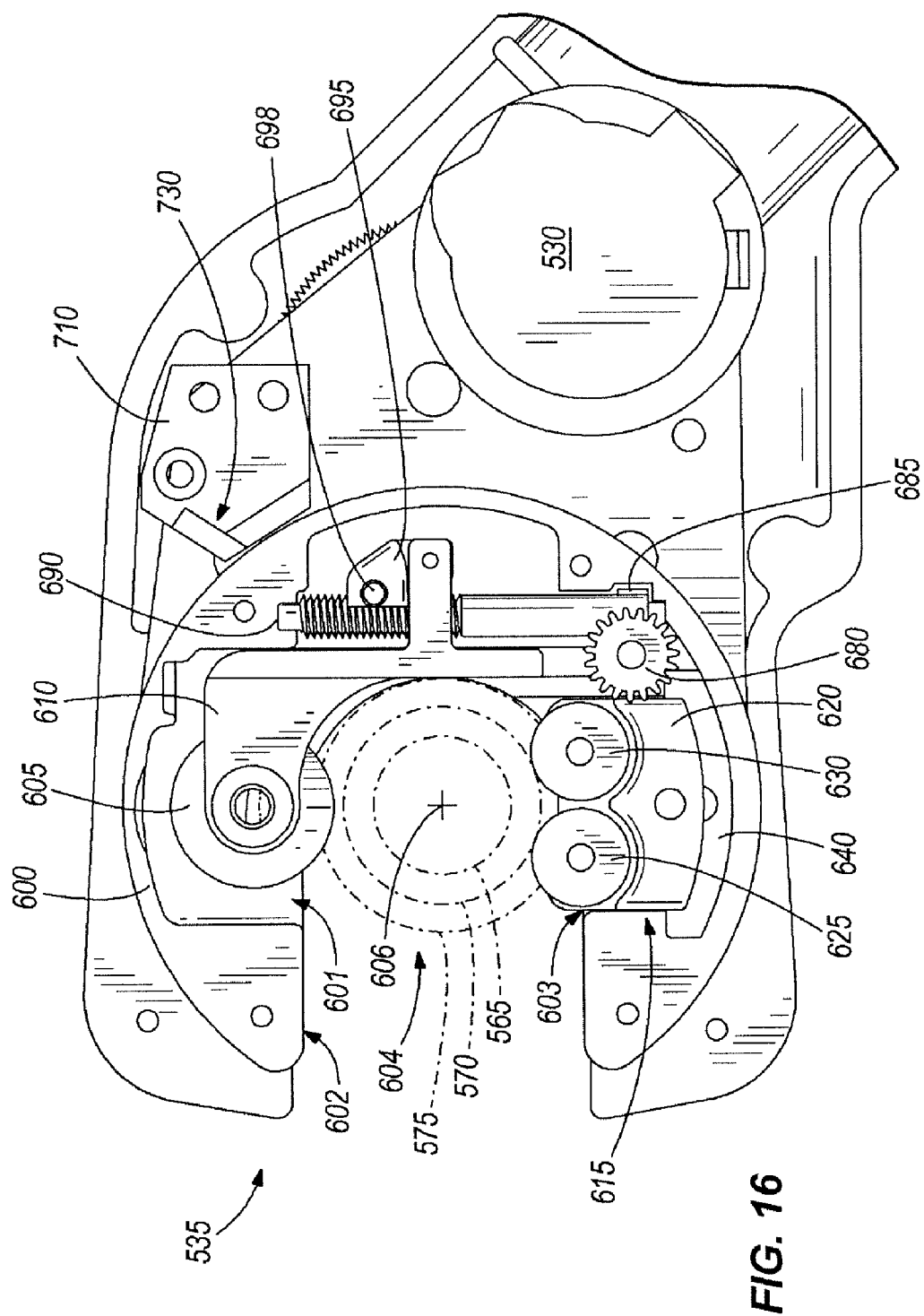
FIG. 16 is a side view of a forward portion of the pipe cutter shown in FIG. 14 with housing portions removed to illustrate a cutting head assembly.

As shown in FIG. 16, the cutting head assembly 525 includes a cutting head 600 having a first area 601 and a second area 603. The cutting head 600 defines an opening 602 in which to receive a pipe or workpiece for cutting. The cutting head 600 also defines a cutting area 604 in which to position the pipe for cutting. As shown in FIG. 16, the cutting area 604 is generally circular and has a center point 606. The pipe is positioned within the cutting area 604, such that a longitudinal axis of the pipe is positioned roughly within the center point 606 of the cutting area 604. As shown in FIG. 16, the first area 601 of the cutting head 600 is positioned on one side of the center point 606 and the second area 603 of the cutting head 600 is positioned on the other side of the center point 606 across from the first area 601. As discussed below, the cutting head 600 rotates around the pipe roughly about the center point 606 during the cutting operation.

In the illustrated embodiment, the cutting head assembly 525 also includes a blade or cutting wheel 605 mounted to a cutting wheel carriage 610. Portions of both the cutting wheel 605 and the cutting wheel carriage 610 are contained within and supported by the cutting head 600. As shown in FIG. 16, the cutting wheel carriage 610 includes a cutting wheel mounting portion 612, a supporting leg portion 613 coupled to and extending from the cutting wheel mounting portion 612 and an arm portion 614 coupled to and extending from the supporting leg portion 613. A portion of the cutting wheel 605 protrudes from the first area 601 of the cutting head 600 and the cutting wheel carriage 610 into the cutting area 604.

The cutting head assembly 525 may also include a roller assembly 615. As shown in FIG. 16, at least a portion of the roller assembly 615 is contained within and supported by the cutting head 600. The roller assembly 615 also includes a portion which protrudes into the cutting area 604. The cutting area 604 is positioned between the roller assembly 615 and the cutting wheel 605 and wheel carriage 610. During operation, the pipe to be cut is centered within the cutting area 604 by the roller assembly 615, as discussed below.

The roller assembly may include one or more rollers mounted on a roller carriage 620. In the illustrated embodiment, the roller assembly 615 includes a first roller 625 and a second roller 630 mounted on the roller carriage 620.

Figure 20:
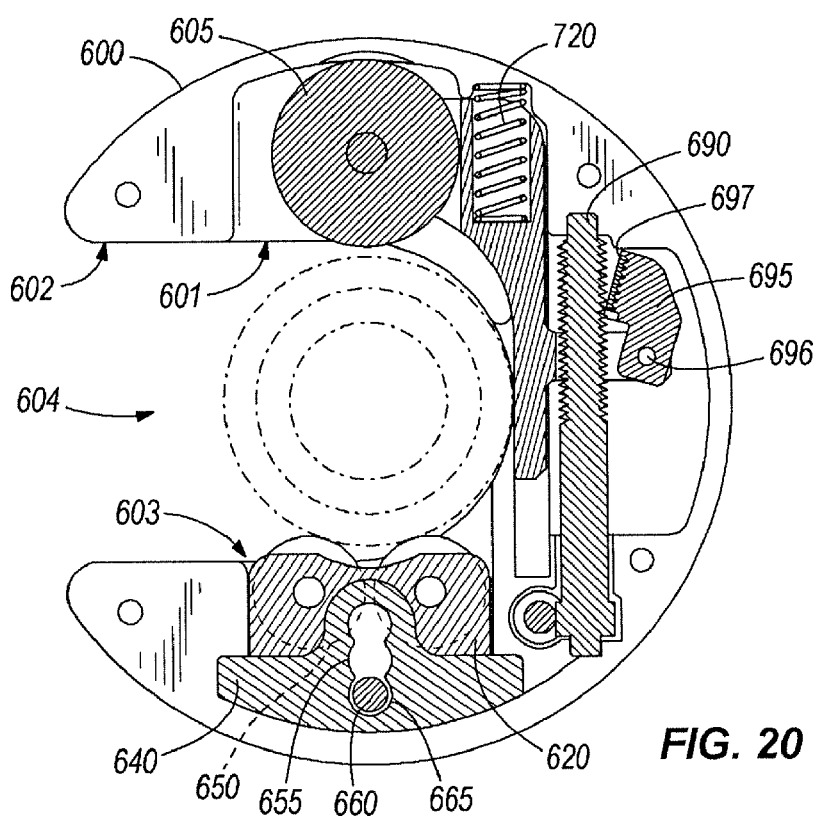
FIG. 20 is cross-section side view of the cutting head assembly shown in FIG. 19.

The roller assembly 615 may also include an adjustment plate 640. The distance that the roller assembly 615 protrudes into the cutting area 604 may be adjusted via the adjustment plate 640. As shown in FIG. 20, the adjustment plate 640 includes three (3) fittings: a first fitting 650, a second fitting 655 and a third fitting 660. The roller carriage 620 includes an aperture 665 for receiving a set screw. The set screw couples the roller carriage 620 to the adjustment plate 640 through one of the three fittings 650, 655, 660. In the illustrated embodiment, the fittings 650, 655, 660 correspond to the three different sizes of pipe the pipe cutter 500 may cut. For example, the roller assembly 615 may be adjusted to accommodate the ½" diameter pipe by coupling the roller carriage 620 to the adjustment plate 640 through the first fitting 650. Also as an example, the roller assembly 615 may be adjusted to accommodate the ¾" diameter pipe by coupling the roller carriage 620 to the adjustment plate 640 through the second fitting 655. The roller assembly 615 may be further adjusted to accommodate the 1" diameter pipe by coupling the roller carriage 620 to the adjustment plate 640 through the third fitting 660.

Figure 17:
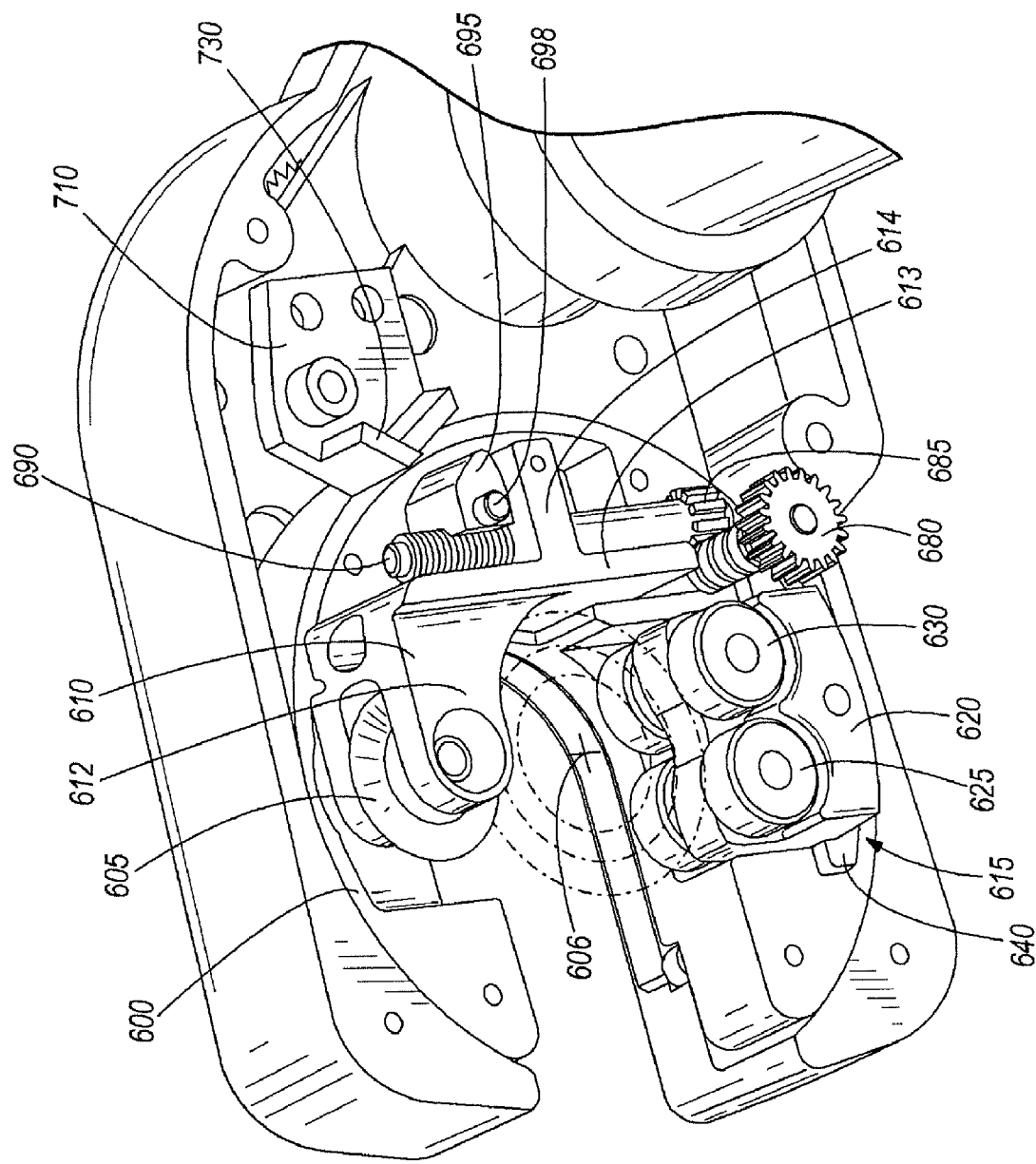
FIG. 17 is a perspective view of the cutting head assembly shown in FIG. 16.
Figure 18:
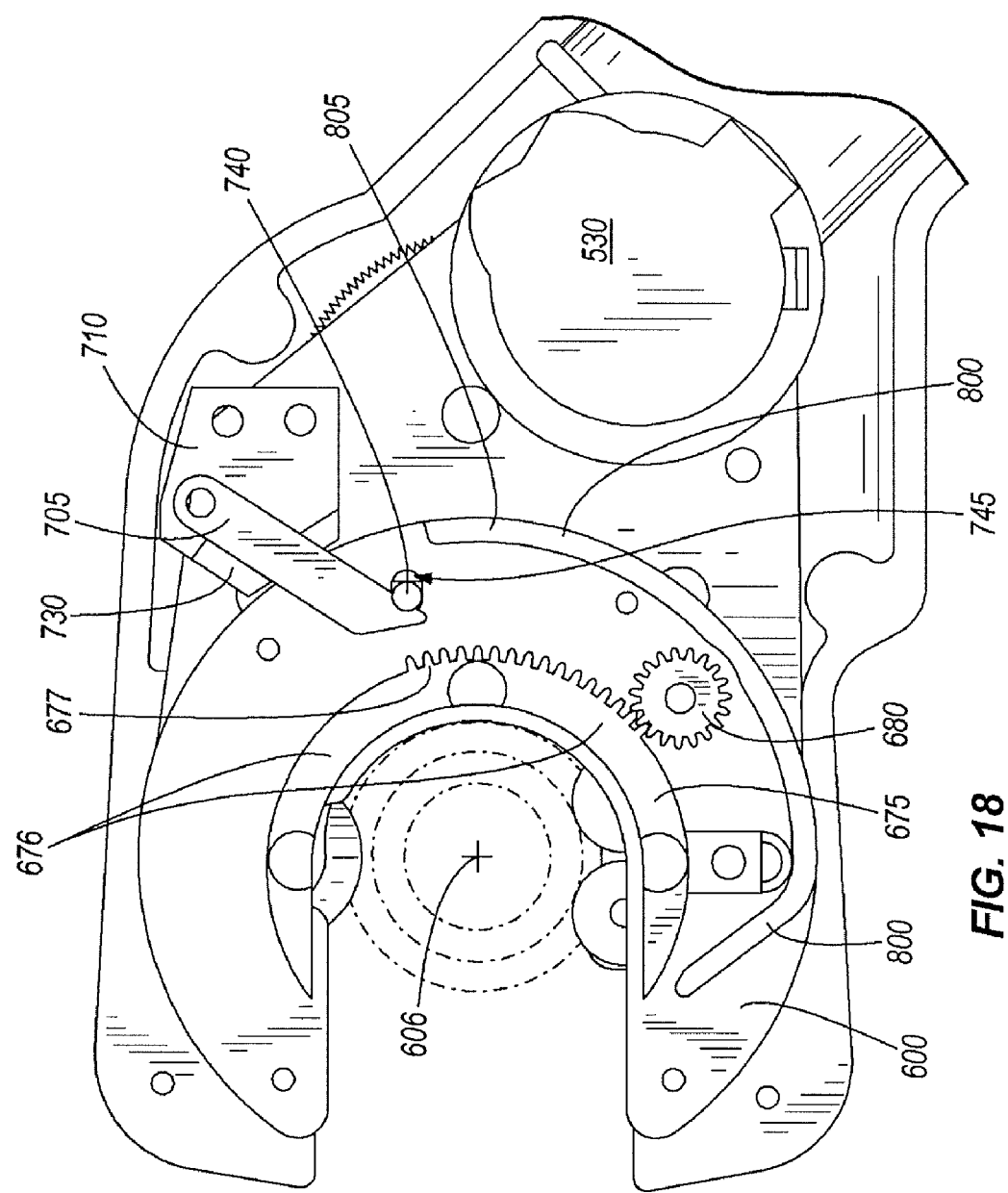
FIG. 18 is another side view of the cutting head assembly shown in FIG. 14 with housing portions removed to illustrate a timing gear and portions of the cutting head assembly.

As shown in FIGS. 16-21, the cutting head assembly 525 further includes a timing gear 675, a worm screw 680, an advancing gear 685, a threaded cutting screw 690, and a pawl 695. In the illustrated embodiment, the timing gear 675 is fixed to the housing 510 and does not rotate with the cutting head 600. The timing gear 675 includes a non-threaded portion 676 and a threaded portion 677. Only the threaded portion 677 of the timing gear 675 engages with the worm screw 680, as shown in FIG. 18.

The worm screw 680 is mounted to the cutting head 600 and engages with both the threaded portion 677 of the timing gear 675 and the advancing gear 685. The advancing gear 685 is coupled to the end of the threaded cutting screw 690. Thus, the threaded cutting screw 690 rotates or spins with the advancing gear 685. The pawl 695 is threadedly engaged with the threaded cutting screw 690 and moves up and down the screw 690 depending on the direction of rotation of the cutting screw 690 and advancing gear 685.

Figure 19:
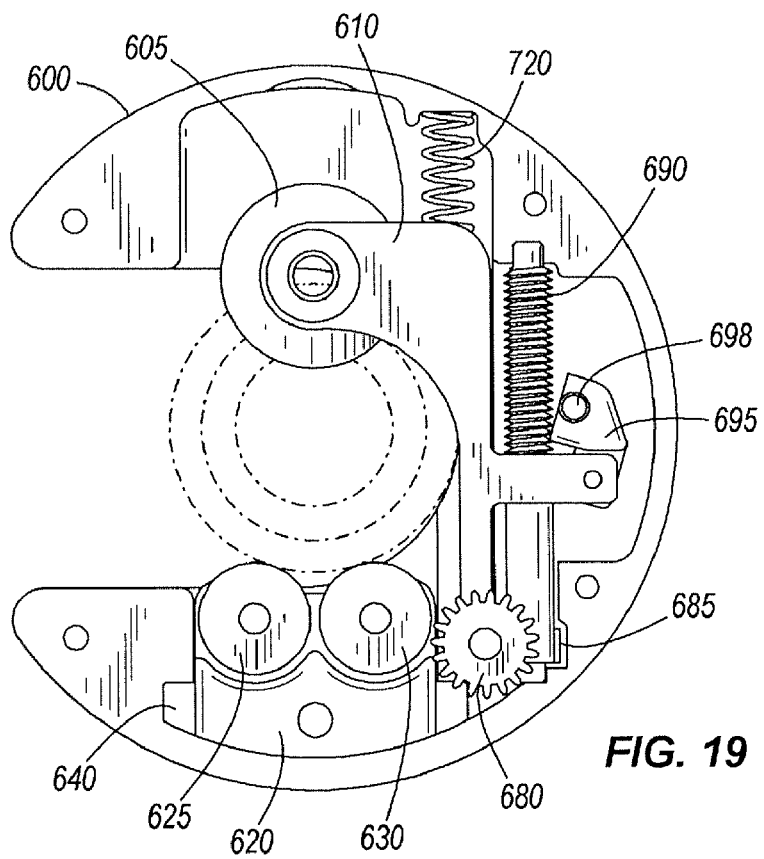
FIG. 19 is a side view of cutting head assembly of the pipe cutter shown in FIG. 16-17.

The pawl 695 may be further coupled to the cutting head carriage 610 via a connection pin 696 (FIG. 20). As shown in FIG. 20, the pawl 695 pivots about the connection pin 696 from a closed or engaged position (FIG. 16) and an open or disengaged position (FIG. 19). In the closed position, the pawl 695 is threadedly engaged with the threaded cutting screw 690. In the open position, the pawl 695 is no longer threadedly engaged with the threaded cutting screw 690. As shown in FIG. 19, the pawl includes a threaded portion 697 which engages with the screw 690. When the pawl 695 moves with respect to the screw 690 (as will be discussed below), the threads bias the pawl 695 into the closed position. Also, as shown in FIG. 19, the pawl 695 includes a pawl pin 698 extending outwardly from the pawl 695.

As shown in FIGS. 16-21, the cutting head assembly 525 further includes a release 700, a trip lever 705, a trip frame 710 and a spring 720. The trip frame 710 is a metal frame supported by the housing 510. The trip frame 710 does not rotate with the cutting head 600 during operation. The trip lever 705 is mounted on the trip frame 710 and is biased toward a catch or stop surface 730 of the trip frame 710 via a trip spring.

Figure 21:
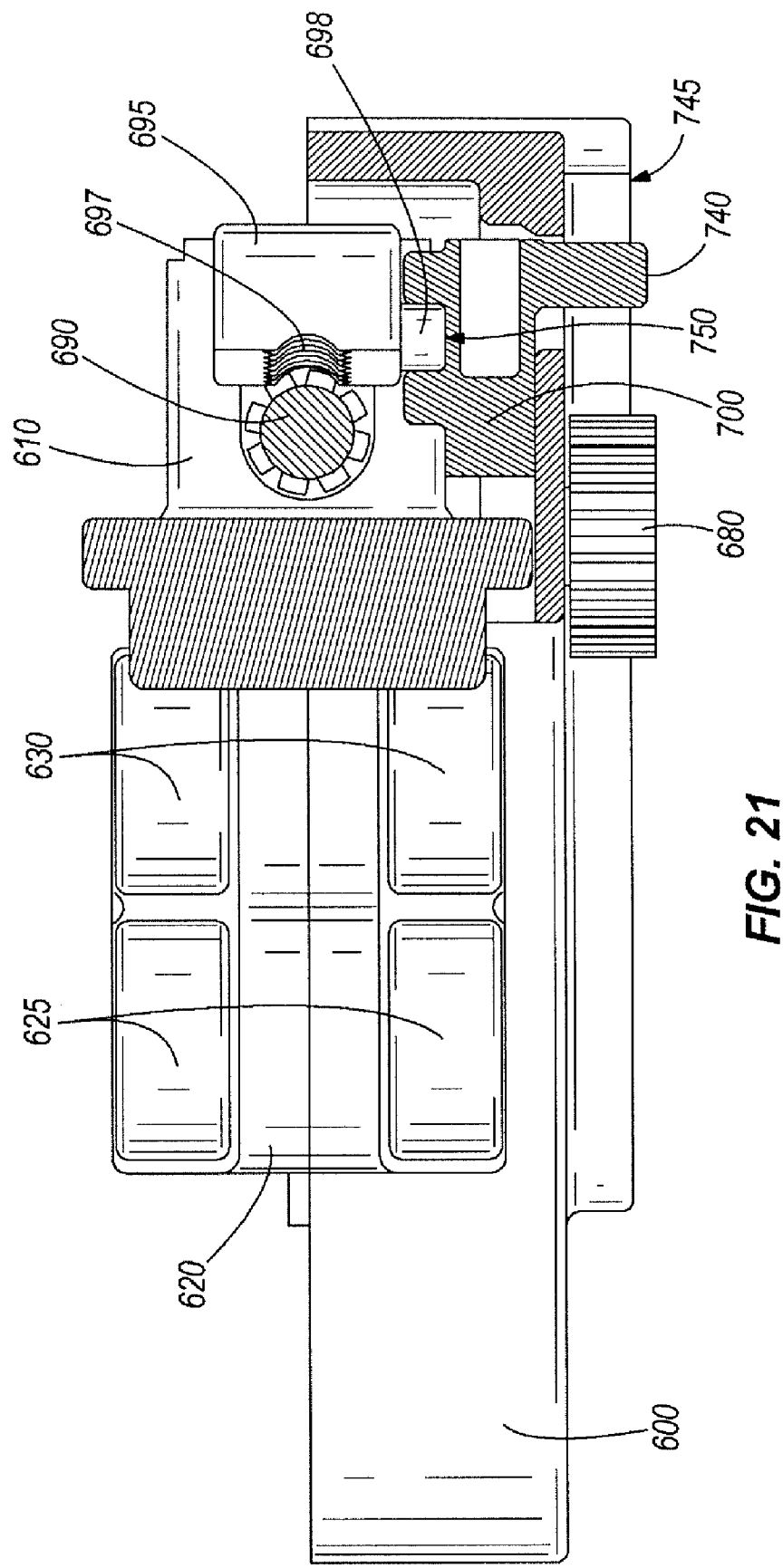
FIG. 21 is a top view of a portion of the pipe cutter shown in FIG. 16 with housing portions removed to illustrate a portion of the cutting head assembly Before at least one embodiment of the invention is explained in detail, it is to be understood that the invention is not limited in its application to the details of the construction and the arrangements of the components set forth in the following description or illustrated in the drawings. The invention is capable of other embodiments and of being practiced or carried out in various ways. In addition, it is understood that the phraseology and terminology used herein are for the purpose of description and should not be regarded as limiting.

As shown in FIGS. 18 and 21, the release 700 includes a pin 740 that extends through a pin opening 745 defined by the cutting head 600. The release 700, and thus the pin 740, is biased toward the cutting area 604 of the cutter 500 by a spring. The release 700 includes a slot 750 which receives the pawl pin 698 of the pawl 695. As the pawl 695 moves up and down the threaded cutting screw 690, the pawl pin 698 slides up and down the slot 750 of the release 700.

The spring 720 is a light spring which applies a smaller force to the cutting wheel carriage 610 when the pawl 695 is disengaged with the threaded cutting screw 690. When the pawl 695 is disengaged, the cutting wheel carriage 610 is free to move along the threaded cutting screw 690. However, the force applied by the spring 720 biases the carriage 610, and thus the cutting wheel 605, downward. In the illustrated embodiment, the force of the pipe, when inserted into the cutting area 604, overcomes the force exerted by the spring 720. When the pipe is inserted, the pipe forces the cutting wheel 605 upward, which forces the cutting wheel carriage 610 to move up the threaded cutting screw 690 and "snap" the pawl 695 into engagement with the screw 690.

Operation of the pipe cutter 500 will be described with respect to FIGS. 15-21. First, the user selects the pipe to be cut and positions the pipe within the cutting area 604. As discussed above, when the pipe is inserted into the cutting area 604, the pipe pushes the cutting wheel 605 (and thus the cutting wheel carriage 610) upward and snaps the pawl 695 into engagement. Based on the diameter of the pipe, the user adjusts the roller carriage 620 to the appropriate height, such that the pipe rests on the first and second rollers 625 and 630.

When the user activates the ON position of a trigger from the OFF position, the motor 530 is energized by a battery 505 to drive the drive gear 540 in a forward direction. The drive gear 540 and the remainder of the drive assembly operate in the same or similar manner to the drive assembly discussed in previous embodiments.

Referring to FIGS. 16-17, the cutting head 600 now rotates in forward direction and moves the cutting wheel 605 around the circumference of the pipe. As the cutting head 600 rotates and the cutting wheel 605 cuts the pipe, the worm screw 680 engages with the threaded portion 677 of the timing gear 675 and rotates clockwise. When the worm screw 680 passes the threaded portion 677 of the timing gear 675, the worm screw 680 is no longer in engagement with the timing gear 675 and stops rotation. Accordingly, during one revolution of the cutting head 600, the timing gear 675 only engages with the worm screw 680 for a portion of that revolution and only advances the screw 680 a few revolutions.

The clockwise rotation of the worm screw 680 drives the advancing gear 685 in a counter-clockwise manner, but again, only when the worm screw 680 is engaged with the threaded portion 677. Every time the advancing gear 685, and in turn the cutting screw 690, is driven in the counter-clockwise manner, the threaded cutting screw 690 forces the pawl 695 to move down the threaded cutting screw 690. This in turn forces the cutting wheel carriage 610 to move downward toward the cutting area 604 at a certain rate. In the illustrated embodiment, this assembly is configured such that the cutting wheel carriage 610 (and thus the cutting wheel 605) advances 0.004" per revolution of the cutting head 600. In other embodiments, the feed rate of the cutting wheel 605 may be greater than or less than the feed rate shown and described.

Also, as the cutting head 600 rotates clockwise, a ridge 800 coupled to the outside surface of the cutting head 600 engages with the trip lever 705 and overcomes the force of the trip spring to bias the trip lever 705 away from the cutting area 604. When the end portion 805 of the ridge 800 passes, the trip spring biases the trip level 705 back against the catch 730 of the trip frame 710 until the next revolution.

During each revolution of the cutting head 600, the cutting wheel 605 advances downward toward the cutting area 604 at the feed rate described above. Once the cutting wheel 605 has completed the cut, the user selects the reverse position of the trigger. This reverses the direction of the motor 530 and the cutting head 600 is driven in a counter-clockwise manner as shown in FIG. 16.

Referring to FIG. 16, as the cutting head 600 rotates in a counter-clockwise manner, the pin 740 of the release 700 is forced away from the cutting area 604 by the trip lever 705. The release 700, in turn, forces the pawl 695 to disengage with threaded cutting screw 690 and the cutting wheel carriage 610 is biased back down in the home position, ready for the next cut.

In the illustrated embodiment, for example, the pipe cutter 500 with a feed rate of 0.004" per revolution cuts a ¾" diameter type pipe in eight (8) revolutions. At 620 revolutions per minute, the cut takes approximately four (4) seconds. In other embodiments, the feed rate and speed of the cutter 500 may be optimized for certain pipe sizes, types and/or materials.

Although the invention has been described in detail with reference to certain preferred embodiments, variations and modifications exist within the scope and spirit of one or more independent aspects of the invention as described.

What is claimed is:

1. A pipe cutter for cutting a pipe, the pipe cutter comprising:
 a cutting head assembly including a first carriage and a second carriage spaced apart to define a cutting area, the first carriage having a first portion supporting a cutting mechanism and the second carriage configured to support a pipe within the cutting area, wherein the carriages have a locked state and an unlocked state, further wherein when the carriages are in the unlocked state, the carriages are movable relative to each other and biased into the cutting area;

a drive assembly configured to rotate the cutting head assembly; and a locking mechanism configured for changing the carriages from the unlocked state to the locked state and for holding a second portion of the first carriage in a locked state relative to the second carriage, the locking mechanism comprising, an actuation member rotatably coupled to the second portion of the first carriage, wherein rotation of the cutting head assembly causes rotation of the actuation member relative to the first carriage, and a locking member configured for engagement with the first carriage and the second carriage upon rotation of the actuation member, wherein engagement of the locking member with the first carriage and the second carriage holds the carriages in the locked state, wherein the first carriage includes a biasing member between the first portion and the second portion, wherein upon rotation of the cutting head assembly the actuation member rotates relative to the first carriage and deflects the biasing member such that a biasing force acts on the cutting mechanism to cut the pipe.

2. The pipe cutter of claim 1 wherein the cutting mechanism includes a blade.

3. The pipe cutter of claim 1 wherein the second carriage includes a pair of rollers.

4. The pipe cutter of claim 1 wherein the actuation member comprises a cam, the cam including a cam shaft, a lever extending from the cam shaft, and a post positioned at a free end of the lever.

5. The pipe cutter of claim 4, and further comprising a cam actuator fixed relative to the cutting head assembly, wherein the cam actuator engages the post to rotate the cam member as the cutting head assembly rotates.

6. The pipe cutter of claim 1 wherein the locking mechanism further comprises a support member coupled to the second carriage and the locking member engages the support member upon rotation of the actuation member to hold the carriages in the locked state.

7. The pipe cutter of claim 6 wherein the locking member comprises, a lift member selectively engageable with the actuation member for movement relative to the support member as the actuation member rotates; and a locking plate for engaging the support member and the first carriage, wherein the lift member moves the locking plate into engagement with the support member and the first carriage.

8. The pipe cutter of claim 7 wherein the support member includes a plurality of notches, each notch corresponding to a position of the carriages in the locked state.

9. The pipe cutter of claim 8 wherein when the carriages are in the locked state, the locking plate engages one of the plurality of notches to hold the carriages in the corresponding position of the locked state.

10. The pipe cutter of claim 8 wherein each of the positions of the carriages corresponds to a pipe diameter.

11. The pipe cutter of claim 1, wherein in the unlocked state the carriages are configured to receive the pipe within the cutting area.

12. The pipe cutter of claim 1, wherein in the locked state the carriages hold the pipe within the cutting area.

13. The pipe cutter of claim 1, and further comprising a battery-powered drive assembly.

14. The pipe cutter of claim 1, and further comprising a housing containing the cutting head assembly, the housing including a window located in a wall of the housing for viewing the cutting area through the housing.

15. The pipe cutter of claim 1, and further comprising a water-tight seal located between a forward portion of the pipe cutter including the cutting head assembly and a handle portion of the pipe cutter.

16. The pipe cutter of claim 1 wherein the biasing member is a biasing arm having the first portion and the second portion.

17. The pipe cutter of claim 11 wherein the cutting head assembly further comprises:

a spring biasing the second carriage into the cutting area; and an over-center position for the pipe, the over-center position defined by the cutting mechanism and a support surface of the second carriage, wherein in the locked state the carriages hold the pipe in the over-center position.

18. The pipe cutter of claim 1 wherein the cutting head assembly rotates in a first direction to change the carriages to the locked state and the cutting head assembly rotates in a second direction to release the carriages to the unlocked state.

19. The pipe cutter of claim 18, and further comprising a release mechanism for releasing the carriages to the unlocked state, the release mechanism including a lever pivotally coupled to a housing of the pipe cutter proximate the cutting head assembly, wherein during rotating of the cutting head assembly in the second direction the actuation member contacts the lever to release the locking member from engagement with the first carriage and the second carriage.

20. The pipe cutter of claim 19 wherein the release mechanism includes a stop boss extending from an outer surface of the cutting head assembly, wherein during rotation of the cutting head assembly in the second direction the stop boss contacts the lever to stop rotation of the cutting head assembly.

21. A pipe cutter for cutting a pipe, the pipe cutter comprising:

a cutting head assembly including, a first carriage including a biasing arm having a first portion with a cutting mechanism, and having a second portion, a second carriage spaced apart from the first carriage to define a cutting area, the second carriage including a support surface for supporting a pipe within the cutting area, an over-center position for the pipe, the over-center position defined by the cutting mechanism and the support surface, wherein the carriages have an unlocked state for inserting the pipe into the cutting area and a locked state for cutting the pipe, wherein when the first carriage is in the unlocked state the first carriage is movable relative to the second carriage and is biased into the cutting area, and a spring biasing the second carriage into the cutting area such that when the second carriage is in the unlocked state, the second carriage is movable relative to the first carriage;

a drive assembly configured to rotate the cutting head assembly; and a locking mechanism configured for moving the carriages from the unlocked state to the locked state and for holding the carriages in the locked state when the pipe is positioned in the over-center position, the locking mechanism comprising, an actuation member rotatably coupled to the second portion of the first carriage, wherein rotation of the cutting head assembly causes rotation of the actuation member relative to the first carriage, and a locking member configured for engagement with the second portion of the first carriage and the second carriage upon rotation of the actuation member, wherein engagement of the locking member locks the second portion of the first carriage and the second carriage together and deflects the biasing arm such that a biasing force acts on the cutting mechanism to cut the pipe.

22. The pipe cutter of claim 21 wherein the cutting mechanism includes a blade.

23. The pipe cutter of claim 21 wherein the support surface of the second carriage includes a pair of rollers.

24. The pipe cutter of claim 21, and further comprising a battery-powered drive assembly.

25. The pipe cutter of claim 21, and further comprising a housing containing the cutting head assembly, the housing including a window located in a wall of the housing for viewing the cutting area through the housing.

26. The pipe cutter of claim 21, and further comprising a water-tight seal located between a forward portion of the pipe cutter including the cutting head assembly and a handle portion of the pipe cutter.

27. The pipe cutter of claim 21, and further comprising:
a handle portion including a first hand grip and a second hand grip; and
a switch assembly positioned on the handle portion between the first hand grip and the second hand grip.

28. The pipe cutter of claim 21 wherein each of the carriages includes a forward angled surface proximate an opening to cutting area, the forward angled surfaces being symmetrical and configured to guide a pipe into the cutting area.

29. The pipe cutter of claim 28 wherein the biasing arm includes a projection opposite the support surface and forward of the over-center position.

30. The pipe cutter of claim 29, wherein each of the carriages includes a rear angled surface rearward of the over-center position, the rear angled surfaces being symmetrical and converging at the rear portion of the cutting area.

31. The pipe cutter of claim 21, wherein the actuation member comprises a cam member, the cam member including a cam shaft, a lever extending from the cam shaft, and a post positioned at a free end of the lever.

32. The pipe cutter of claim 31, and further comprising a cam actuator fixed relative to the cutting head assembly, wherein the cam actuator engages the cam post to rotate the cam member as the cutting head assembly rotates.

33. The pipe cutter of claim 21, wherein the locking mechanism further comprises a support member coupled to the second carriage.

34. The pipe cutter of claim 33, wherein the locking member comprises:
a lift member selectively engageable with the actuation member for movement relative to the support member as the actuation member rotates; and
a locking plate for engaging the support member and the first carriage, wherein the lift member moves the locking plate into engagement with the support member and the first carriage.

35. The pipe cutter of claim 33 wherein the support member includes a plurality of notches, the locking plate engaging one of the plurality of notches when the locking mechanism is in the locked state, each notch corresponding to a position of the carriages in the locked state.

36. The pipe cutter of claim 35 wherein each of the positions of the carriages corresponds to a pipe diameter.

* * * * *